United States Patent
Asanuma

(10) Patent No.: US 9,618,607 B2
(45) Date of Patent: Apr. 11, 2017

(54) RADAR APPARATUS AND SIGNAL PROCESSING METHOD

(71) Applicant: FUJITSU TEN LIMITED, Kobe-shi, Hyogo (JP)

(72) Inventor: Hisateru Asanuma, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 456 days.

(21) Appl. No.: 14/176,749

(22) Filed: Feb. 10, 2014

(65) Prior Publication Data

US 2014/0313070 A1 Oct. 23, 2014

(30) Foreign Application Priority Data

Apr. 19, 2013 (JP) ................................. 2013-088131

(51) Int. Cl.
| | | |
|---|---|---|
| G01S 15/93 | (2006.01) | |
| G01S 7/41 | (2006.01) | |
| G01S 13/02 | (2006.01) | |
| G01S 13/34 | (2006.01) | |
| G01S 13/93 | (2006.01) | |

(52) U.S. Cl.
CPC ................ G01S 7/41 (2013.01); G01S 13/02 (2013.01); G01S 13/345 (2013.01); G01S 13/931 (2013.01)

(58) Field of Classification Search
CPC ........... G01S 13/931; G01S 2013/9375; G01S 13/02; G01S 7/41
USPC ..................................................... 342/70, 85
See application file for complete search history.

(56) References Cited

U.S. PATENT DOCUMENTS

| | | | | |
|---|---|---|---|---|
| 6,018,308 A | * | 1/2000 | Shirai | ..................... G01S 7/412 342/118 |
| 6,404,328 B1 | * | 6/2002 | Alland | ..................... G01S 7/411 340/435 |
| 8,674,873 B2 | * | 3/2014 | Shibata | .................. G01S 13/345 342/118 |
| 2003/0001771 A1 | * | 1/2003 | Ono | ........................ G01S 7/411 342/70 |

(Continued)

FOREIGN PATENT DOCUMENTS

| | | |
|---|---|---|
| JP | A-2001-324566 | 11/2001 |
| JP | 2002-202365 A | 7/2002 |

(Continued)

OTHER PUBLICATIONS

Jan. 10, 2017 Office Action issued in Japanese Application No. 2013-088131.

*Primary Examiner* — John B Sotomayor
*Assistant Examiner* — Marcus Windrich
(74) *Attorney, Agent, or Firm* — Oliff PLC

(57) ABSTRACT

There is provided a radar apparatus capable of extracting a peak signal obtained from a difference frequency between a transmitting signal and a receiving signal during first and second periods and deriving target information based on the extracted peak signals. A pairing unit pairs the peak signals extracted in the first and second periods. A judging unit judges whether or not the derived target is an overhead object based on the number of paired data of a stationary object existing within a predetermined range from the radar apparatus, among the paired data obtained by pairing the peak signals in the pairing unit.

10 Claims, 21 Drawing Sheets

(56) References Cited

U.S. PATENT DOCUMENTS

| | | | |
|---|---|---|---|
| 2003/0076255 A1* | 4/2003 | Ono | G01S 13/34 |
| | | | 342/70 |
| 2011/0221628 A1* | 9/2011 | Kamo | G01S 7/295 |
| | | | 342/70 |
| 2011/0234450 A1* | 9/2011 | Sakai | G01S 7/4802 |
| | | | 342/70 |
| 2011/0298656 A1* | 12/2011 | Bechler | G01S 13/931 |
| | | | 342/26 R |
| 2013/0038484 A1* | 2/2013 | Ohkado | G01S 13/345 |
| | | | 342/70 |

FOREIGN PATENT DOCUMENTS

| JP | 2004-012198 A | 1/2004 |
|---|---|---|
| JP | A-2007-93481 | 4/2007 |
| JP | 2009-063440 A | 3/2009 |

* cited by examiner

RADAR APPARATUS AND SIGNAL PROCESSING METHOD

CROSS-REFERENCE TO RELATED APPLICATIONS

This application is based on and claims priority from Japanese Patent Application No. 2013-088131 filed on Apr. 19, 2013.

TECHNICAL FIELD

The present invention relates to signal processing for derivation of a target.

BACKGROUND

In the past, a vehicle-mounted radar apparatus derives a position of a target with respect to a vehicle (radar apparatus) by transmitting a transmission wave from a transmitter antenna and receiving a reflection wave from the target by a receiver antenna. The detailed process thereof is as follows. A signal processing unit of the radar apparatus generates a beat signal by mixing a transmitting signal corresponding to the transmission wave of which a frequency is changed in a given period, and a receiving signal corresponding to the reflection wave. That is, the signal processing unit generates the beat signal based on a frequency difference (beat frequency) between the transmitting signal and the receiving signal in each period including an up period in which the frequency ascends in a predetermined period, and a down period in which the frequency descends in a predetermined period.

Then, the signal processing unit generates a signal (transformed signal) for every frequency by processing the beat signal through FFT (Fast Fourier Transform). Among the transformed signals, a signal exceeding a threshold of a predetermined signal level is extracted as a peak signal. The signal processing unit derives paired data by pairing the peak signal of the up period and the peak signal of the down period based on a given condition.

For example, the signal processing unit derives paired data (predicted paired data) predicting the current paired data based on the paired data which is derived in the past, and derives a peak signal (predicted peak signal) predicting the current peak signal. And, the signal processing unit extracts a peak signal (predicted peak signal) predicting the current peak signal from the predicted paired data. And, the signal processing unit extracts the current peak signal included in a predetermined range, with a frequency of the predicted peak signal being as a base point, as a current peak signal corresponding to the predicted peak signal, for every up period and down period. The signal processing unit derives paired data by pairing the peak signal of each corresponding period from the frequency of the extracted peak signal and the angular information.

The signal processing unit derives a distance (vertical distance) from the vehicle to the target, or a distance (horizontal distance) of the target with respect to a vehicle running in a direction substantially perpendicular to a traveling direction of the vehicle. Further, the signal processing unit derives a relative speed of the target with respect to the vehicle. The signal processing unit outputs determined information about the target, including the position of the target and the relative speed of the target, to a vehicle control device, so that the vehicle control device performs necessary vehicle control according to the target information.

But, if the derived target is a stationary object (e.g., road sign of a cantilever type or gate type installed above the road, or illumination installed at ceiling of tunnel) installed at a position sufficiently higher than a vehicular height of the vehicle, such a target is a target which is not required for the control of the vehicle. Information about the target is removed not to be output to the vehicle control device. For example, there are Patent Documents 1 and 2.

Patent Document 1: Japanese Patent Application Publication No. 2001-324566A

Patent Document 2: Japanese Patent Application Publication No. 2007-093481A

However, for example, in the case of the tunnel having the low ceiling, the target information corresponding to the illumination or the like installed at the ceiling may be misjudged as a target of the preceding vehicle. Specifically, in the tunnel having the low ceiling so that a passenger car can drive, but a vehicle having a high vehicular height, such as a truck or a bus, cannot drive, the height of the illumination or the like installed at the ceiling is possibly set to be lower than the height of the truck or bus. In this instance, it is misjudged as the preceding vehicle despite the target corresponding to the illumination or the like of the ceiling, and thus the target information is not removed and is output to the vehicle control device, so that the vehicle control device performs the vehicle control of the brake or the like.

SUMMARY

It is therefore an object of the present invention to provide a technology of avoiding a vehicle being controlled in a wrong way by reliably removing target information which is not necessary for a control of the vehicle.

(1) According to an aspect of the embodiments of the present invention, there is provided a radar apparatus capable of extracting a peak signal obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the extracted peak signals, the radar apparatus comprising: a pairing unit configured to pair the peak signal extracted in the first period and the peak signal extracted in the second period; and a judging unit configured to judge whether or not the derived target is an overhead object based on the number of paired data of a stationary object existing within a predetermined range from the radar apparatus, among the paired data obtained by pairing the peak signals in the pairing unit.

(2) The radar apparatus according to (1), wherein the judging unit judges that the derived target is the overhead object, if the number of the paired data of the stationary object existing within the predetermined range is above a first threshold.

(3) The radar apparatus according to (2), wherein the judging unit judges that the derived target is the overhead object, if a distance between the paired data of the stationary object is above a first distance.

(4) The radar apparatus according to (2) or (3), wherein the judging unit releases a judgment that the derived target is the overhead object, if the number of the paired data of the stationary object existing within the predetermined range is below a second threshold.

(5) The radar apparatus according to (2) or (3), wherein the judging unit releases a judgment that the derived target is the overhead object, if angular power of the target judged as the overhead object is above a predetermined value.

(6) The radar apparatus according to any one of (1) to (5), wherein if the target is judged as the overhead object above predetermined times within a predetermined time, the judging unit subsequently executes a judging process of which a condition is relaxed.

(7) The radar apparatus according to (6), wherein the judging unit judges that the derived target is the overhead object, if the number of the paired data of the stationary object existing within the predetermined range is above a third threshold which is lower than first threshold.

(8) The radar apparatus according to (7), wherein the judging unit judges that the derived target is the overhead object, if the distance between the paired data of the stationary object is above a second distance which is lower than the first distance.

(9) The radar apparatus according to, any one of (6) to (8), wherein the judging unit continuously executes the judging process of which the condition is relaxed, for a predetermined time.

(10) The radar apparatus according to (9), wherein if the target is not judged as the overhead object within the predetermined time, the judging unit releases execution of the judging process of which the condition is relaxed.

(11) According to another aspect of the embodiments of the present invention, there is provided a signal processing method capable of extracting a peak signal obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the extracted peak signals, the signal processing method comprising: (a) pairing the peak signal extracted in the first period and the peak signal extracted in the second period; and (b) judging whether or not the derived target is an overhead object based on the number of paired data of a stationary object existing within a predetermined range from the radar apparatus, among the paired data obtained by pairing the peak signals in the step (a).

According to the aspects of (1) to (11), it is possible to derive whether or not the derived target is the overhead object based on the number of the paired data of the stationary object existing within the predetermined range from the subject vehicle. Therefore, if the stationary object exists in plural, that is, illumination or the like installed at a ceiling is derived, it is possible to judge that the illumination or the like is the overhead object. As a result, since it is possible to avoid the overhead object from being wrongly judged as the preceding vehicle or the like, the wrong vehicle control can be prevented.

According to the aspect of (2), in a case where there is high possibility that the stationary objects such as illuminations exist in union, it is possible to judge the stationary object as the overhead object. Further, according to the aspect of (3), if the distance between the paired data of the stationary object is far away from the predetermined distance, that is, the distance has a constant interval, it is possible to judge the stationary object as the overhead object.

According to the aspects of (4) and (5), once the target is judged as the overhead object, the judgment of the target having the high possibility that the judgment is incorrect is released, thereby avoiding the target such as the preceding vehicle from being eliminated.

According to the aspects of (6) to (10), in the case where the subject vehicle is under the environment capable of easily deriving the overhead object, it is possible to reliably derive the overhead object by setting the condition to easily derive the overhead object.

DETAILED DESCRIPTION OF THE EMBODIMENTS

Hereinafter, embodiments of the present invention will now be described with reference to the accompanying drawings.

1. First Embodiment 1-1 Summary

First, before each configuration and process of the present invention will be described in detail, the summary of the present invention will now be described. The present invention is to derive the number of paired data of stationary objects on the basis of a target existing within a range of a predetermined distance from a vehicle, and judge whether or not the target is an overhead object of a low-ceiling tunnel according to the number. Hereinafter, the configuration and process will be described in further detail.

1-2. Configuration

Figure 1:
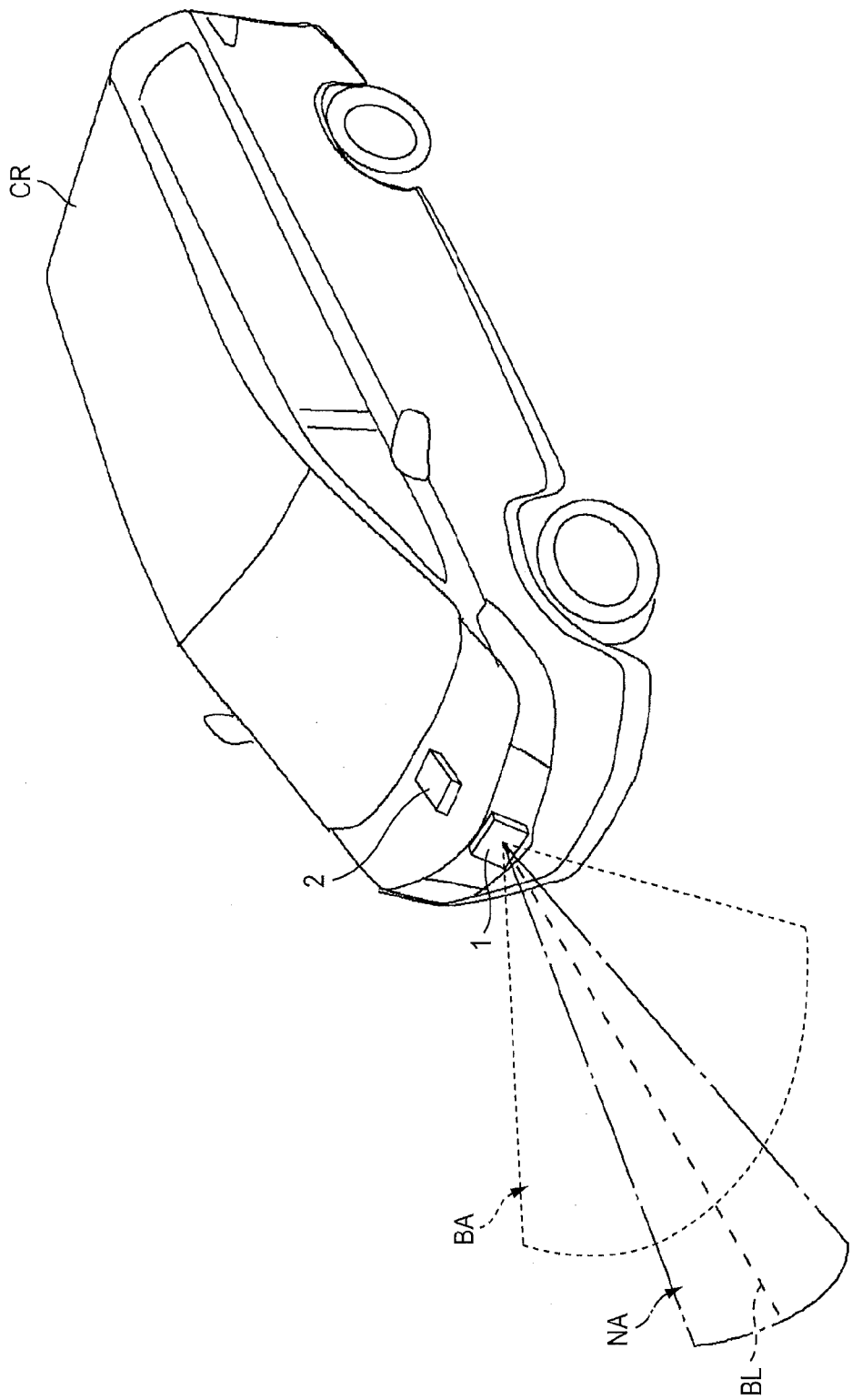
FIG. 1 is a diagram of an overall vehicle.

FIG. 1 is a view of an overall vehicle CR. The vehicle CR usually includes a radar apparatus 1 and a vehicle control device 2 which are provided in a vehicle control system 10 according to this embodiment. The radar apparatus 1 is installed at a front portion of the vehicle CR. The radar apparatus 1 scans a given scanning scope through once scanning to derive a distance corresponding to a traveling direction of the vehicle CR between the vehicle CR and a target, that is, a distance (vertical distance) when a reflection wave from the target arrives at the reception antenna of the radar apparatus 1. Also, the radar apparatus 1 derives a distance corresponding to a horizontal direction (vehicular width direction) of the vehicle CR between the vehicle CR and the target, that is, a distance (horizontal distance) of the target with respect to the vehicle CR in a direction substantially perpendicular to a reference axis BL which imaginarily extends in the traveling direction of the vehicle CR. In this instance, the horizontal distance is derived by performing a trigonometric operation function based on information about an angle of the target with respect to the vehicle CR. In this way, the radar apparatus 1 derives information about the position of the target with respect to the vehicle CR. Further, the radar apparatus 1 derives a relative speed which is a speed of the target with respect to the speed of the vehicle CR.

In this instance, FIG. 1 shows a beam pattern of a transmission wave transmitted from two transmission antennas (transmission antenna 13a and transmission antenna 13b illustrated in FIG. 2) of the radar apparatus which will be described later. Supposing that the reference axis BL is an angle ±0 degree, a beam pattern NA of the transmission wave outputted from the transmission antenna 13a has a narrow angular range (e.g., ±6 degrees) in comparison to a beam pattern BA of the transmission wave outputted from the transmission antenna 13b, and is output as a relatively sharp beam pattern having a long vertical distance. The reason of the long vertical distance is that an output level outputting the transmission wave is relatively high.

Contrary to this, the beam pattern BA of the transmission wave outputted from the transmission antenna 13b has a wide angular range (e.g., ±10 degrees) in comparison to the beam pattern NA of the transmission wave outputted from the transmission antenna 13a, and is output as a relatively broad beam pattern having a short vertical distance. The reason of the short vertical distance is that the output level outputting the transmission wave is relatively low. By outputting a transmission wave of a different beam pattern at each a transmission period of a transmission period in which the transmission antenna 13a outputs the transmission wave, and a transmission period in which the transmission antenna 13b outputs the transmission wave, it is possible to prevent an error in each derivation due to phase aliasing of the reflection wave from the target. The process of deriving the angle of the target will be described later.

A mount position of the radar apparatus 1 in FIG. 1 is near the front bumper of the vehicle, but it is not limited to the vicinity of the front bumper of the vehicle. As long as the position derives the target according to a purpose of controlling the vehicle CR by the vehicle control device 2 which will be described later, other mount position, such as a rear front portion of the vehicle CR or a side mirror of a lateral portion of the vehicle CR, is possible.

The vehicle CR includes the vehicle control device 2 in the vehicle CR. The vehicle control device 2 is an ECU (Electronic Control Unit) for controlling each device of the vehicle CR.

Figure 2:
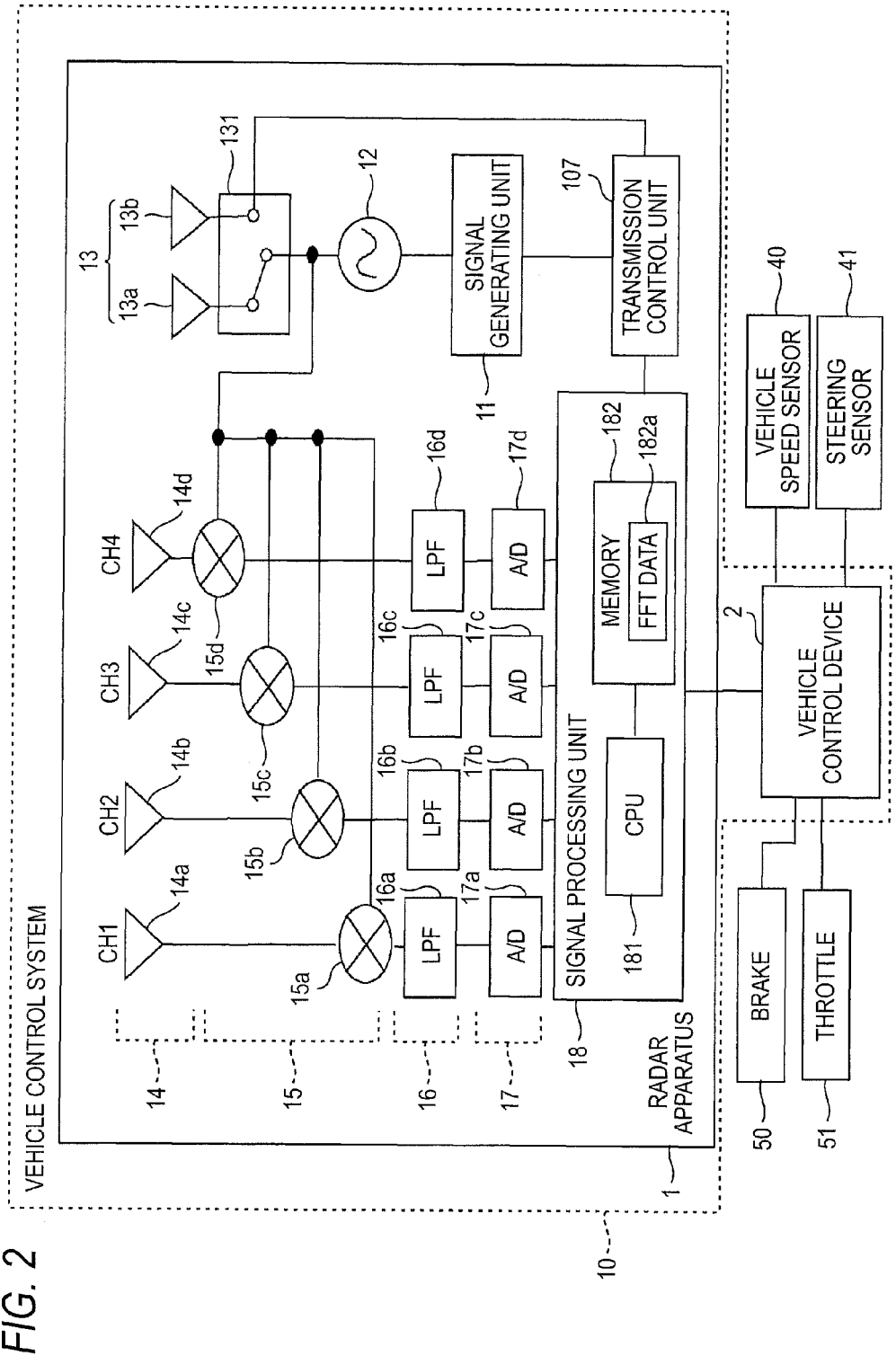
FIG. 2 is a block diagram of a vehicle control system.

FIG. 2 is a block diagram of the vehicle control system 10. The vehicle control system 10 is configured so that the radar apparatus 1 and the vehicle control device 2 are electrically connected to each other, and the target information on the position and the relative speed of the target which are usually derived from the radar apparatus is output to the vehicle control device 2. That is, the radar apparatus 1 outputs the target information including the vertical distance, the horizontal distance, and the relative speed of the target with respect to the vehicle CR to the vehicle control device 2. The vehicle control device 2 controls operation of various devices of the vehicle CR based on the target information. In addition, the vehicle control device 2 of the vehicle control system 10 is electrically connected to various sensors provided in the vehicle CR, such as a vehicle speed sensor 40 and a steering sensor 41. Further, the vehicle control device 2 is electrically connected to various devices provided in the vehicle CR, such as a brake 50 and a throttle 51.

The radar apparatus 1 generally includes a signal generating unit 11, an oscillator 12, a transmission antenna 13, a reception antenna 14, a mixer 15, an LPF (Low Pass Filter) 16, an AD (Analog/Digital) converter 17, and a signal processing unit 18.

The signal generating unit 11 generates a modulation signal, for example, of which a voltage is changed in a triangular-wave shape based on a control signal of a transmission control unit 107 which will be described later.

The oscillator 12 is a voltage control oscillator for controlling an oscillation frequency with a voltage, and frequency-modulates a signal of a given frequency band (e.g., 76.5 GHz), based on the modulated signal generated from the signal generating unit 11, to output it to the transmission antenna 13 as a transmitting signal with a center frequency of 76.5 GHz.

The transmission antenna 13 outputs a transmission wave relating to the transmitting signal to the outside of the vehicle. The radar apparatus 1 according to this embodiment includes two transmission antennas, that is, a transmission antenna 13a and a transmission antenna 13b. The transmission antennas 13a and 13b are switched in a predetermined period by a switching of a conversion unit 131, and the transmission wave is continuously output to the outside of the vehicle from the transmission antenna 13 connected to the oscillator 12. The transmission antenna 13a and the transmission antenna 13b have a different arrangement (antenna pattern) of antenna elements. Therefore, the beam pattern of the transmission wave transmitted from the transmission antennas 13a and 13b is different from each other, as illustrated in FIG. 1.

The conversion unit 131 is a switch for converting a connection of the oscillator 12 and the transmission antenna 13, and connects the oscillator 12 and any one of the transmission antenna 13a and the transmission antenna 13b according to the signal of the transmission control unit 107.

The reception antenna 14 is a plurality of array antennas receiving a reflection wave coming from the target at which the transmission wave continuously transmitted from the transmission antenna 13 is reflected. In this embodiment, the reception antenna 14 includes four reception antennas, that is, reception antennas 14a(ch1), 14b(ch2), 14c(ch3) and 14d(ch4). Each antenna of the reception antennas 14a to 14d is arranged at a regular interval.

The mixer 15 is provided at each reception antenna. The mixer 15 mixes the receiving signal and the transmitting signal. A beat signal which is a difference between both signals, that is, the transmitting signal and the receiving signal, is generated by mixing the transmitting signal and the receiving signal, and is output to the LDF 16.

The transmitting signal and the receiving signal which generate the beat signal will now be described by taking a signal processing method of FM-CW (Frequency Modulated Continuous Wave) as an example with reference to FIG. 3. Although the FM-CW method will be described as an example in this embodiment, the present invention is not limited to this method, if the method derives the target by combining a plurality of periods, such as an up period in which the frequency of the transmitting signal ascends, and a down period in which the frequency of the transmitting signal descends.

Figure 3:
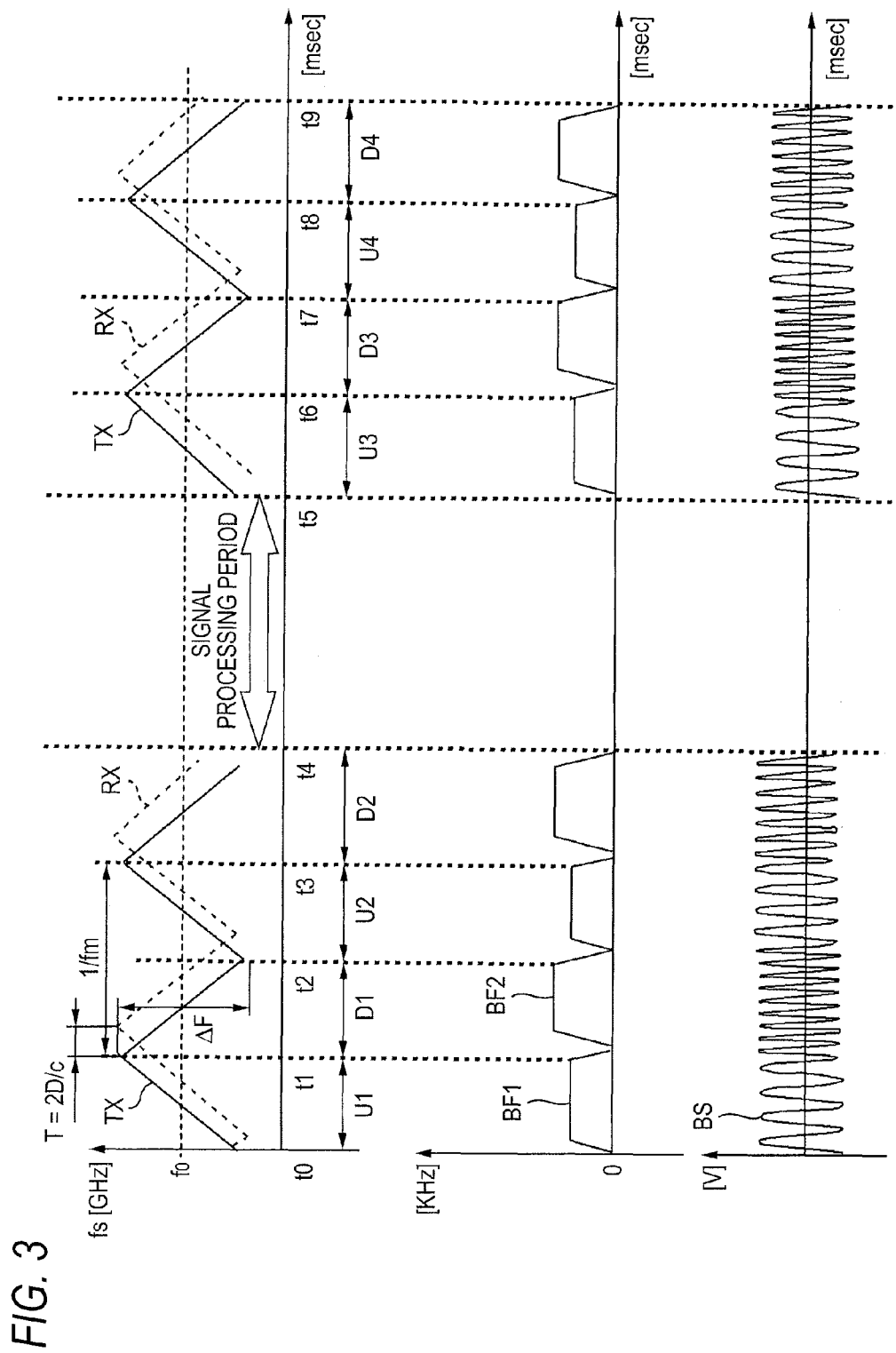
FIG. 3 is a diagram illustrating a signal of an FM-CW mode.

Symbols that appear in expressions described below and signals and beat frequencies of the FM-CW shown in FIG. 3 are as follows: fr: distance frequency, fd: speed frequency, fo: center frequency of a transmission wave, $\Delta F$: frequency deviation width, fm: repetition frequency of a modulation wave, c: speed of light (speed of wave), T: reciprocating time of a wave between the vehicle CR and the target, fs: transmission/reception frequency, R: vertical distance, V: relative speed, $\theta m$: angle of the target, $\theta up$: angle corresponding to a peak signal in the up period, and $\theta dn$: angle corresponding to a peak signal in the down period.

FIG. 3 is a diagram illustrating a signal of an FM-CW mode. An upper drawing in FIG. 3 shows a signal waveform of a transmitting signal TX of an FM-CW mode and a receiving signal RX of an FM-CW mode, in which a horizontal axis represents a time (msec). In the drawing, the transmitting signal TX repeats a constant change between 200 MHz, for example, it descends to a predetermined frequency (e.g., 76.6 GHz) and then ascends up to a predetermined frequency (e.g., 76.4 GHz), with a center frequency being 10. It has a period (referred to as an up period, and including, for example, periods U1, U2, U3 and U4 shown in FIG. 3) in which the frequency ascends up to a predetermined frequency and a period (referred to as a down period, and including, for example, periods D1, D2, D3 and D4) in which the frequency descends to a predetermined frequency after it ascended to the predetermined frequency. Further, if the transmission wave transmitted from the transmission antenna 13 is reflected from the object, and then is received by the reception antenna 14 as the reflection wave, the receiving signal RX is input to the mixer 15 via the reception antenna 14. In the same manner as the transmitting signal TX, the receiving signal RX also has an up period in which the frequency ascends up to a predetermined frequency, and a down period in which the frequency descends to a predetermined frequency.

The radar apparatus 1 of this embodiment transmits the transmission wave corresponding to two cycles of transmitting signal TX, in which a combination of one up period and one down period is one cycle of the transmitting signal TX, to the outside of the vehicle. For example, the transmission wave of a beam pattern NA is output from the transmission antenna 13a during the first cycle (period U1 of up period at transmitting periods t0 to t1 and period D1 of down period at transmitting periods t1 to t2). The transmission wave of a beam pattern BA is output from the transmission antenna 13b during the next second cycle (period U2 of up period at transmitting periods t2 to t3 and period D2 of down period at transmitting periods t3 to t4). The signal processing unit 18 performs a signal processing to derive the target information using the transmitting signal TX and the receiving signal RX (signal processing period of t4 to t5). After that, the transmission wave of the beam pattern NA is output from the transmission antenna 13a during the third cycle (period U3 of up period at transmitting periods t5 to t6 and period D3 of down period at transmitting periods t6 to t7), and the transmission wave of the beam pattern BA is output from the transmission antenna 13b during the fourth cycle (period U4 of up period at transmitting periods t7 to t8 and period D4 of down period at transmitting periods t8 to t9). After that, the signal processing unit 18 performs the signal processing to derive the target information. Subsequently, the same process is repeated.

In this instance, a temporal delay (time T) occurs in the receiving signal RX relative to the transmitting signal TX in accordance with the distance of the target with respect to the vehicle CR. In addition, if there is a speed difference between the speed of the vehicle CR and the speed of the target, a difference occurs between the transmitting signal TX and the receiving signal RX by Doppler shift.

The middle drawing in FIG. 3 shows a bit frequency generated by the difference between the transmitting signal TX and the receiving signal RX in the up period and the down period, in which a vertical axis represents a frequency (kHz), and a horizontal axis represents a time (msec). For example, a bit frequency BF1 is derived in the period U1, while a bit frequency BF2 is derived in the period D1. The bit frequency is derived in each period.

The lower drawing in FIG. 3 shows a bit signal corresponding to the bit frequency, in which a vertical axis represents an amplitude (V), and a horizontal axis represents a time (msec). In the drawing, a bit signal BS which is an analog signal corresponding to the bit frequency is shown, and after the bit signal BS is filtered by the LPF 16 which will be described later, it is converted into digital data by the AD converter 17. In this instance, although FIG. 3 shows the bit signal BS corresponding to the receiving signal RX in the case of receiving it from one reflective point, if the transmission wave corresponding to the transmitting signal TX is reflected from a plurality of reflective points and is received by the reception antenna 14 as a plurality of reflection waves, the receiving signal RX generates a signal according to the plurality of reflection waves. In this instance, the bit signal BS indicative of the difference between the transmitting signal TX and the receiving signal RX is synthesized by each difference between the plurality of receiving signals RX and the plurality of transmitting signals TX.

After the bit signal BS is converted into digital data by the AD converter 17, the digital data is FFT-processed for each of the up period and the down period by the signal processing unit 18 to acquire FFT data having the value of the signal level and the phase information for every frequency of each bit signal BS in the up period and the down period. In this instance, FFT data is acquired for every each of the reception antennas 141 to 14d.

The vertical distance, the relative speed, and the horizontal distance of the target with respect to the vehicle CR are derived by use of the plurality of FFT data derived by the above manner. In the case of usually performing computation technique, such as spatial average, to derive an angle, correct angular information can be derived by computation using the plurality of FFT data.

Herein, the vertical distance of the target with respect to the vehicle CR is derived by Expression 1, and the relative speed of the target with respect to the vehicle CR is derived by Expression 2. Further, the angle of the angle with respect to the vehicle CR is derived by Expression 3. The horizontal distance of the target with respect to the vehicle Cr is derived by computation using a trigonometric function from the information about the vertical distance of the target and the angle derived by Expression 3.

[Expression 1]

$$R = \frac{(f_{up} + f_{dn}) \cdot c}{2 \times (4 \times \Delta F \times f_m)} \quad (1)$$

[Expression 2]

$$V = \frac{(f_{up} - f_{dn}) \cdot c}{2 \times (4 \times \Delta F \times f_m)} \quad (2)$$

[Expression 3]

$$\theta_m = \frac{\theta_{up} + \theta_{dn}}{2} \quad (3)$$

Returning back to FIG. 2, the LPF (Low Pass Filter) 16 is a filter capable of decreasing a component of a frequency higher than a predetermined frequency, without decreasing a component of a frequency lower than the predetermined frequency. In this instance, the LPF 16 is also installed in each reception antenna, as well as the mixer 15.

The AD converter 17 derives plural sampling data by sampling the beat signal that is an analog signal in a predetermined cycle. Further, the AD converter 16 quantizes the sampled data to convert the beat signal of the analog data into digital data, and output the digital data to the signal processing unit 18. The AD converter 17 is installed in each reception antenna, as well as the mixer 15.

The signal processing unit 18 is a computer including a CPU 181 and a memory 182, and acquires the FFT data by FFT-processing the beat signal of the digital data outputted from the AD converter 17. The signal processing unit 18 extracts a signal, of which the value of the signal level exceeds a predetermined threshold, among the bit signals of FFT data as a peak signal. The signal processing unit 18 derives target information by pairing the peak signal of the up period and the peak signal of the down period. Further, the signal processing unit 18 judges whether or not the extracted peak signal is a ghost peak corresponding to the target which does not exist actually, thereby excluding the target information corresponding to the peak signal of the ghost from an output subject of the radar apparatus.

The memory 182 is stored with an execution program, such as various computation processes executed by the CPU 181. Further, the memory 182 is stored with plural target information derived by the signal processing unit 18. For example, the memory is stored with target information (vertical distance, horizontal distance, and relative speed of target) derived in the past process and the current process. The memory 182 is stored with FFT data 182a acquired by the FFT process. The FFT data 182a is recorded with FFT data of the past target deriving process including the FFT data in the current target deriving process.

The transmission control unit 107 is connected to the signal processing unit 18, and outputs the control signal to the signal generating unit 11 for generating a modulated signal, based on the signal from the signal processing unit 18. Further, the transmission control unit 107 outputs the control signal to the conversion unit 131 connected to any one transmission antenna of the transmission antenna 13a and the transmission antenna 13b and the oscillator 12, based on the signal from the signal processing unit 18.

The vehicle control device 2 controls operations of various, devices provided in the vehicle CR. That is, the vehicle control device 2 obtains information from various sensors, such as the vehicle speed sensor 40 and the steering sensor 41. The vehicle control device 2 controls the behavior of the vehicle CR by operating various devices, such as the brake 50 and the throttle 51, based on the information obtained from various sensors and the target information obtained from the signal processing unit 18 of the radar apparatus 1.

Examples of the vehicle control performed by the vehicle control device 2 are as follows. The vehicle control device 2 controls the vehicle CR to follow up the preceding vehicle which is moving in the same traffic lane as the traveling vehicle CR. Specifically, the vehicle control device 2 controls at least one of brake 50 and the throttle 51 according to the traveling of the vehicle CR to perform the control of ACC which allows the vehicle CR to follow-up drive the preceding vehicle in the state of securing a given intervehicular distance between the vehicle CR and the preceding vehicle.

Further, as an example of the vehicle control performed by the vehicle control device 2, the vehicle control device 2 performs the control of protecting passengers of the vehicle CR in preparation for that the vehicle CR collides with an obstacle. Specifically, in a case where there is danger that the vehicle CR collides with an obstacle, a user of the vehicle CR is given by warning indication using an alarm device (not illustrated), or PCS (Pre-crash Safety System) is controlled to reduce the speed of the vehicle CR by controlling the brake 50. Further, the vehicle control device 2 performs the PCS control by fixing the passenger to a seat by means of a seat belt, or fixing a headrest to reduce damage, of a passenger's body of the vehicle CR against an impact when collision occurs.

The vehicle speed sensor 40 outputs a signal according to the speed of the vehicle CR based on a rotational speed of an axle of the vehicle CR. The vehicle control device 2 takes a current speed of the vehicle based on the signal from the vehicle speed sensor 40.

The steering sensor 41 detects a steering angle of a steering wheel which is operated by a driver of the vehicle CR, and transmits the information about an angle of a vehicular body of the vehicle CR to the vehicle control device 2.

The brake 50 decelerates the speed of the vehicle CR by the operation of the driver of the vehicle CR. Further, the brake 50 decelerates the speed of the vehicle CR by the control of the vehicle control device 2. For example, the speed of the vehicle CR is decelerated to maintain the distance between the vehicle CR and the preceding vehicle at a constant distance.

The throttle 51 accelerates the speed of the vehicle CR by operation of the driver of the vehicle CR. Further, the throttle 51 accelerates the speed of the vehicle CR by the control of the vehicle control device 2. For example, the throttle 51 accelerates the speed of the vehicle Cr to maintain the distance between the vehicle CR and the preceding vehicle at a constant distance.

1-3. Overall Processing

Figure 4:
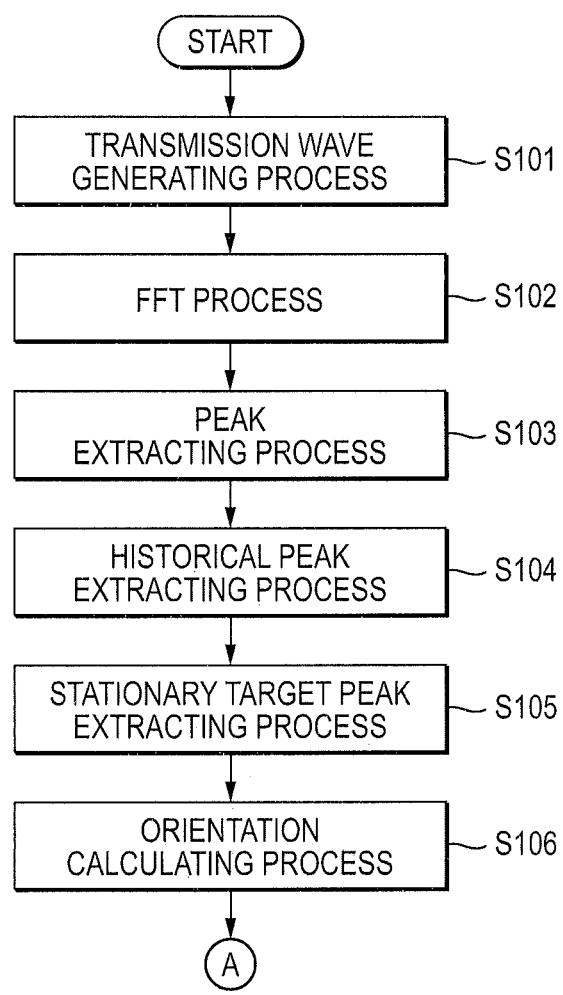
FIG. 4 is a flowchart illustrating a process of deriving target information.
Figure 5:
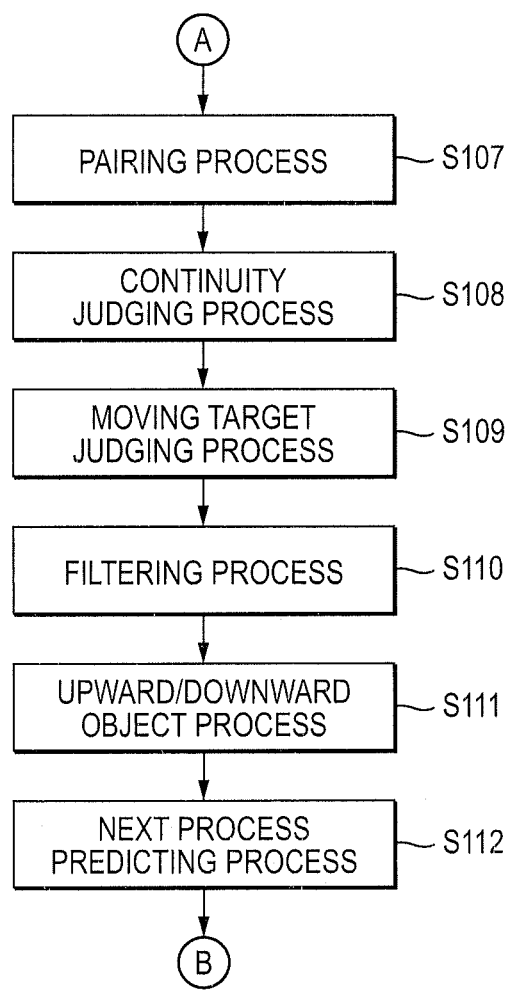
FIG. 5 is a flowchart illustrating the process of deriving the target information.
Figure 6:
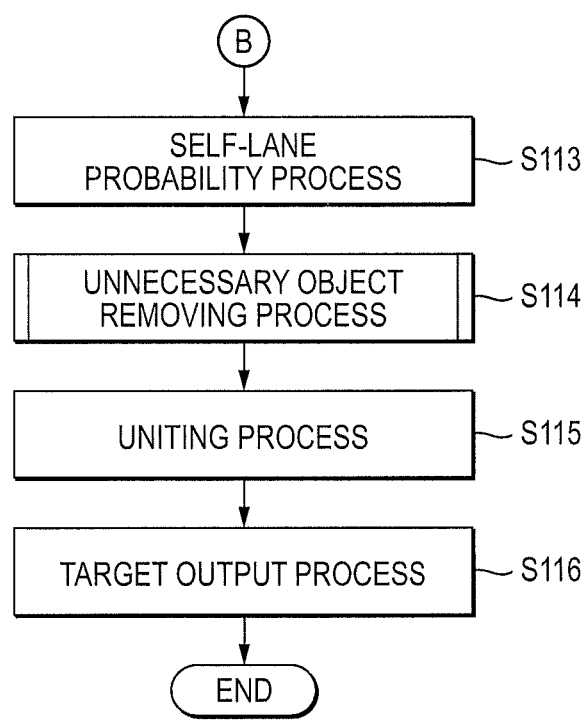
FIG. 6 is a flowchart illustrating the process of deriving the target information.

FIGS. 4 to 6 are flowcharts illustrating the process in which the signal processing unit 18 derives the target information. The signal processing unit 18 outputs an instruction signal of generating the transmission wave to the transmission control unit 107 (step S101). The signal generating unit 11 is controlled by the transmission control unit 107 to which the instruction signal is input from the signal processing unit 18, and the transmission wave corresponding to the transmitting signal TX is generated. The generated transmission wave is output to the outside of the vehicle.

The reception antenna 14 receives the reflection wave which comes from the target at which the transmission wave reflects, and the mixer 15 mixes the transmitting signal TX and the receiving signal RX corresponding to the reflection wave to generate the beat signal BS which is a difference between the transmitting signal TX and the receiving signal RX. The beat signal which is the analog signal is filtered by the LPF 16, and is converted into the digital data by the AD converter 17, and then is input to the signal processing unit 18.

The signal processing unit 18 performs the FFT processing on the beat signal of the digital data to obtain FFT data having a value of the signal level of the bit signal for every frequency (step S102).

Subsequently, the signal processing unit 18 extracts the bit signal, of which the value of the signal level exceeds the given threshold, among the bit signals of FFT data (step S103). In this instance, the peak signals are extracted from the up period and the down period which correspond to two-cycle transmission periods in this process, and thus the number of peak signals is determined.

The signal processing unit 18 performs a historical peak extracting process of extracting a peak signal having continuity with the target derived in the past target deriving process, among the peak signals extracted in the peak extracting process (step S104).

Next, the signal processing unit 18 performs a process of extracting a peak signal of each period, of which a frequency difference between the peak signal of the up period and the peak signal of the down period corresponds to the speed, from the information about the speed of the one's own vehicle obtained by the vehicle speed sensor 40 of the vehicle CR, as a peak signal corresponding to the stationary object (step S105). Herein, the stationary object means a target having the substantially same relative speed as the speed of the vehicle CR. Further, a target moving at a specific speed and having a relative speed different from the speed of the vehicle CR is hereinafter referred to as the stationary object.

In this instance, performing the process of extracting the historical peak (step S104) and the process of extracting the peak of the stationary object (step S105) is to select the peak signal corresponding to the target having the necessity which should be preferentially output to the vehicle control device 2 by the signal processing unit 18. For example, since the peak signal of the target of the current process having the temporal continuity with the target derived in the previous process has a high probability that the target actually exists in comparison to the target which is not derived in the previous process but is newly derived, the peak signal may have a high priority level. Also, since the peak signal corresponding to the moving object has the high probability that the target collides against the vehicle CR, rather than the peak signal corresponding to the stationary object, its priority may be high.

The signal processing unit 18 performs the orientation computation based on the peak signal in each period of the up period and the down period (step S106). Specifically, the signal processing unit 18 derives the orientation (angle) of the target by a given orientation calculating algorithm. For example, the orientation calculating algorithm is ESPRIT (Estimation of Signal Parameters via Rotational Invariance Techniques). A proper value and a proper vector of a correlation matrix are calculated from the phase information of the received signal in each reception antennas 14a to 14d, and an angle θup corresponding to the peak signal of the up period and an angle θdn corresponding to the peak signal of the down period are derived. Meanwhile, in the case where each peak signal of the up period and the down period is paired, the angle of the target is derived by Expression 3 described above. Further, the information about the frequency of one peak signal corresponds to the information about the distance of the target and the relative speed, but information about the plurality of targets may be included in the frequency of one peak signal. For example, in the position information of the target with respect to the vehicle CR, there is a case where the information about the plurality of targets having the same distance value and the different angle value is included in the peak signal of the same frequency. In this instance, since the phase information about the plurality of reflection waves from the different angle becomes different phase information, the signal processing unit 18 derives the plurality of target information which exists at different angle in one peak signal, based on the phase information of each reflection wave.

In the case of performing the orientation computation, the phase may be rotated at an angle of 360 degrees depending on the angle of the target, and thus angle information different from the original angle at which the target exists may be derived. For example, in a case where phase information of the reflection wave from the target received by the reception antenna is 420 degrees, even though the target exists in the region of the beam pattern BA other than the beam pattern NA illustrated in FIG. 1, the phase information is judged as an angle of 60 degrees (420 degrees to 360 degrees) by phase-aliasing, so that wrong angle information, in which there target exists in the region of the beam pattern NA not included in the beam pattern BA, may be derived. For this reason, the transmission wave of different beam pattern is respectively output from two transmission antenna of the transmission antennas 13a and 13b to derive the correct angle of the target.

Specifically, the angle is derived as follows, based on the reflection wave at the transmission wave of each beam pattern. In the case where the phase information of the reflection wave is 60 degrees, the value of the signal level of each angular spectrum corresponding to the reflection wave of the transmission wave of the transmission antenna 13a and the reflection wave of the transmission wave of the transmission antenna 13b is compared to each other, and if the value of the signal level of the angular spectrum corresponding to the reflection wave of the transmission wave of the transmission antenna 13a is high, an angle corresponding to the phase information about 60 degrees in the region of the beam pattern NA except for the region of the beam pattern BA is derived as an angle of the target. Further, the value of the signal level of the angular spectrum corresponding to the reflection wave of the transmission wave of the transmission antenna 13b is high, an angle corresponding to the phase information about 420 degrees in the region of the beam pattern BA except for the region of the beam pattern NA is derived as an angle of the target. Since the transmission wave of different beam pattern is output for each cycle from the transmission wave of 2 cycles of transmission signal TX, the target prevents derivation of the wrong angle information by the phase-aliasing in the case of the orientation computation.

Next, the signal processing unit 18 performs a pairing process of pairing the peak signal of the up period and the peak signal of the down period (step S107). In the pairing process, for the historical peak signals, which are extracted in the historical peak extracting process (step S104), the historical peak signal of the up period and the historical peak signal of the down period are paired, among the whole peak signals derived in step S103. Further, for the stationary object peak signals which are extracted in the stationary object peak extracting process (step S105), the stationary object peak signal of the up period and the stationary peak signal of the down period are paired. In addition, the remaining peak signals except for the historical peak signals and the stationary object peak signals extracted in the peak extracting process, the remaining peak signals of the up period and the remaining peak signals of the down period are paired.

In this instance, the pairing process of the peak signal of the up period and the peak signal of the down period is performed by, for example, computation using a Mahalanobis distance. Specifically, before the radar apparatus 1 is mounted to the vehicle CR, plural data, that is, normal-paired data paired in a correct combination and mis-paired data paired in a wrong combination, is acquired while experimentally pairing the peak signal of the up period and the peak signal of the down period, and an average value for every three parameters of the plurality of normal-paired data is derived from three parameter values of a difference in values of the signal levels, a difference in values of the angle, and a difference in values of the signal levels of angular spectrum, and then is stored in the memory 182 in advance.

The Mahalanobis distance is derived by Expression 4 below using the average value for every three parameters of all combinations of the peak signal of the up period and the peak signal of the down period and three parameters of the plurality of normal-paired data, among the peak signals of FFT data obtained in the current process. The signal processing unit 18 derives the paired data of the current process, in which the Mahalanobis distance is minimized, as the normal-paired data. Herein, the Mahalanobis distance is a value of one group represented by a multivariable vector x=(x1, x2, x3), for example, in which an average is μ=(μ1, μ2, μ3)T and a covariance matrix is Σ. In this instance, μ1, μ2, and μ3 represent values of three parameters of the normal-paired data, and x1, x2, and x3 represent values of three parameters of the paired data of the current process.

$$D_M(x) = \sqrt{(x-\mu)^T \Sigma^{-1}(x-\mu)}$$

The signal processing unit 18 derives the vertical distance, the relative distance, and the horizontal distance, which is based on the angle, of the paired data which is judged as the normal-paired data, using the parameter values of the normal-paired data in the pairing process and Expressions 1 to 3 above. In this instance, the detailed description of the pairing process using the historical peak signal will be given later.

Next, the signal processing unit 18 performs continuity judgment to judge whether or not a temporally consecutive relation exists between the current paired data which is paired by the current target deriving process, and the previous paired data which is paired by the previous process (step S108). The case (there is the continuity) where there is the temporally consecutive relation between both the paired data means, for example, a case where the predicted paired data predicting the current paired data is generated based on the previous paired data, and then a difference value in the vertical distance, the horizontal distance and the relative speed between the current paired data and the predicted paired data is within a predetermined value. In this instance, it is judged that the target derived by the current process and the target derived by the past process is the same target. If the plurality of current paired data exists within the predetermined value, the signal processing unit 18 may judge that the current paired data having the lowest difference value with the predicted paired data has the temporally consecutive relation with the target information of the previous process.

Further, if the difference value of the vertical distance, the horizontal distance and the relative speed between the pared data target information of the current process and the predicted paired data is not within the predetermined value, the signal processing unit 18 judges that there is no temporally consecutive relation (no continuity) between the current paired data and the previous target information. The paired data which is judged that there is no continuity becomes data (newly paired data) which is first derived in the current target deriving process. In this instance, for the newly paired data, since there is no predicted paired data in a filtering process which will be described later, the distance, the relative speed, the angle, and the value of the signal level of the newly paired data become the distance, the relative speed, and angle, and the value of the signal level of one target in the current target deriving process. Further, if it is judged that there is the continuity at predetermined consecutive times (i.e., if it is judged as the same target), the signal processing unit 18 performs a process of determining the detected target as the correct target.

The signal processing unit 18 derives paired data corresponding to the moving target from the information about the speed of the vehicle CR and the relative speed of the paired data (step S109). Since the process is performed, it is possible to derive the paired data having the necessity which should be preferentially processed.

If there is the temporally consecutive relation between the current paired data and the predicted paired data, the signal processing unit 18 performs the filtering of the vertical distance, the horizontal distance, the relative speed, and the value of the signal level between the current paired data and the predicted paired data (step S110), and derives the filtered paired data (past correspondent paired data) as the target information of the current process.

If there is the temporally consecutive relation between both paired data, for example, the signal processing unit 18 adds a value of 0.75 to the horizontal distance of the predicted paired data for the horizontal distance, and adds a value of 0.25 to the horizontal distance of the current paired data. The result obtained by adding both horizontal distances is derived as the horizontal distance of the past correspondent paired data of the current target deriving process. Further, the vertical distance, the relative speed, and the value of the signal level are also filtered Next, the signal processing unit 18 performs an upward/downward object process of deriving a stationary object which is not necessary for the control of the vehicle CR (step S111). Specifically, the signal processing unit derives the stationary object (e.g., road sign of a cantilever type or gate type installed above the road) of which a position of the vehicular height direction of the stopped vehicle CR exists at a position (e.g., higher than a vehicular height of the vehicle CR) higher than a given height. Further, the signal processing unit derives a stationary object (e.g., a traffic button such as a chatter bar attached with a reflective plate which is installed to a median strip or a curve road), existing at a relatively low position than the vehicular height of the vehicle CR. For the stationary object derived by the above manner, the target information is removed by an unwanted object removing process which will be described later, and is not output to the vehicle control device 2 from the radar apparatus 1 as the target information.

In the process (next process) next to the current process, the signal processing unit 18 derives predicted values (predicted vertical distance, predicted relative speed, predicted horizontal distance, or the like) of the next target information to be used in a historical peak extracting process (step S104) (step S112). Specifically, the signal processing unit 18 derives 20 target information having the high priority after the vehicle is controlled, and calculates the predicted values of each peak signal of the up and down periods, which will be used in the next process of deriving the historical peak. In the case of performing the ACC control, the target having the relatively short vertical distance with respect to the vehicle CR at the horizontal position corresponding to the same traffic lane as the traveling vehicle CR has the high priority, while the target having the relatively long vertical distance with respect to the vehicle CR at the horizontal position corresponding to an adjacent traffic lane has the low priority. Further, in the case of the PCS, the target having the relatively short time-to-collision (hereinafter referred to as TTC) has the high priority, while the target having the relatively long TTC has the low priority.

Subsequently, the signal processing unit 18 derives information about the curve radius of the same traffic lane as the traveling vehicle CR, and a horizontal distance according to the curve radius from the vertical distance and the horizontal distance of the target. Specifically, according to information about a rotational angle of the steering wheel input from the steering sensor 41 when a steering wheel (not illustrated) of the vehicle CR is operated by the driver of the vehicle CR, the signal processing unit derives a horizontal distance (relative horizontal distance) of the target with respect to the reference axis BL which is imaginarily changed in a straight line and a curve, and derives the probability (self-lane probability) that the target exits in the same traffic lane as the vehicle, from two-dimensional map data, of which the relative horizontal distance and the vertical distance of the target with respect to the vehicle CR are stored in the memory 182 as the parameters in advance (step S113), based on the relative horizontal distance and the vertical distance of the target with respect to the vehicle CR.

The signal processing unit 18 performs a process of removing the target which is not necessary to be output to the vehicle control device 2, with respect to the target information derived by the above processes (step S114). For example, the signal processing unit 18 removes the target information derived in the above-described upward/downward object process (step S111), and removes the target information of the ghost peak corresponding to the target, which does not actually exist, generated by interference (intermodulation) between the peak signal corresponding to the actual target existing above the predetermined distance and the switching noise of the DC-DC converter of the power supply device of the radar apparatus 1. In addition, the signal processing unit 18 also removes the target information of the stationary objects such as illumination installed at a ceiling portion of the tunnel having a low ceiling.

Next, the signal processing unit 18 performs a process of uniting plural target information as one target information corresponding to one object (step S115). For example, in the case where the transmission wave is emitted from the transmission antenna 13 of the radar apparatus 1, the reflection waves to be received by the reception antenna 14 exist in plural when the transmission wave is reflected from the preceding vehicle. That is, the reflection waves from a plurality of reflection points arrive at the reception antenna 14 for the same object. As a result, the signal processing unit 18 derives plural target information having different position information based on the respective reflection waves, but since it is originally the target information of one vehicle, the signal processing unit 18 performs the process of uniting each target information as one to be handled as the target information of the same object. For this reason, if each relative speed of plural target information is substantially equal, and the vertical distance and the horizontal distance of each target information are within a predetermined range, the signal processing unit 18 regards plural target information as the target information of the same object, and then performs the process of uniting plural target information as the target information corresponding to one target.

The signal processing unit 18 outputs the target information, which has the high priority to be output to the vehicle control device 2, to the vehicle control device 2 (step S116), from the target information united in the process of step S108.

1-4. Unwanted Object Removing Process

Figure 7:
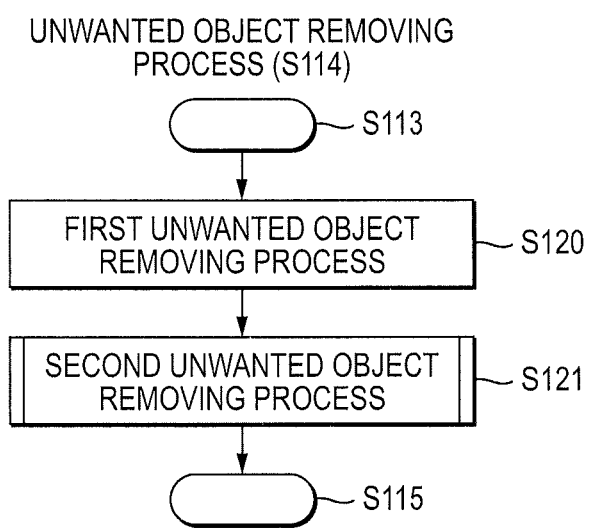
FIG. 7 is a flowchart illustrating an unwanted object removing process.

Next, the unwanted object removing process (step S114) according to this embodiment will be described in detail. FIG. 7 is a flowchart illustrating the unwanted object removing process. The unwanted object removing process according to this embodiment includes a first unwanted object removing process (step S120) of removing the target information and the target information of the ghost peak which are derived in the above-described upward/downward object process, and a process (second unwanted object removing process; step S121) of removing target information of a stationary object (overhead object of a low-ceiling tunnel), such as illumination, installed at the ceiling portion of the tunnel having the low ceiling. The illumination or the like installed at the ceiling portion of the tunnel having the low ceiling possibly exists at a position lower than a vehicular height of a truck or bus, as described above. In this instance, the target information about the illumination or the like is not derived in the upward/downward object process, and thus is not removed in the first unwanted object removing process. For this reason, in this embodiment it is separately performed a process (second unwanted object removing process) of removing the overhead object target information of the low-ceiling tunnel. Hereinafter, the second unwanted object removing process will be described in detail with reference to FIGS. 8 to 17.

Figure 8:
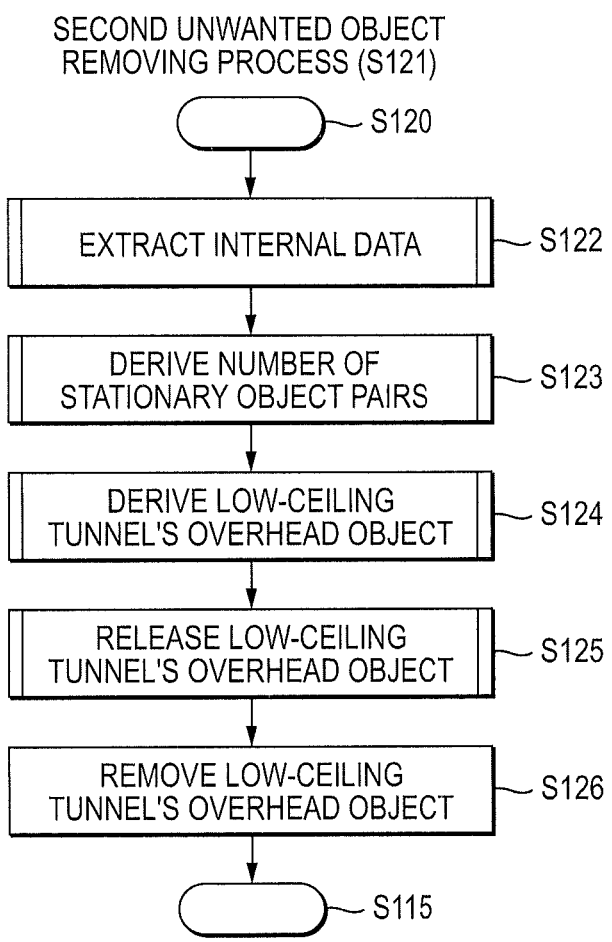
FIG. 8 is a flowchart illustrating a second unwanted object removing process.

FIG. 8 is a flowchart illustrating the unwanted object removing process. As illustrated in FIG. 8, in the second unwanted object removing process (step S121), the signal processing unit 18 first performs a process of extracting internal data (step S122). The internal data is the target information after the filtering process, and the process of extracting the internal data is a process of extracting the internal data having the possibility that it may be the overhead object of the low-ceiling tunnel, among plural internal data derived in a series of target deriving processes described above.

Figure 9:
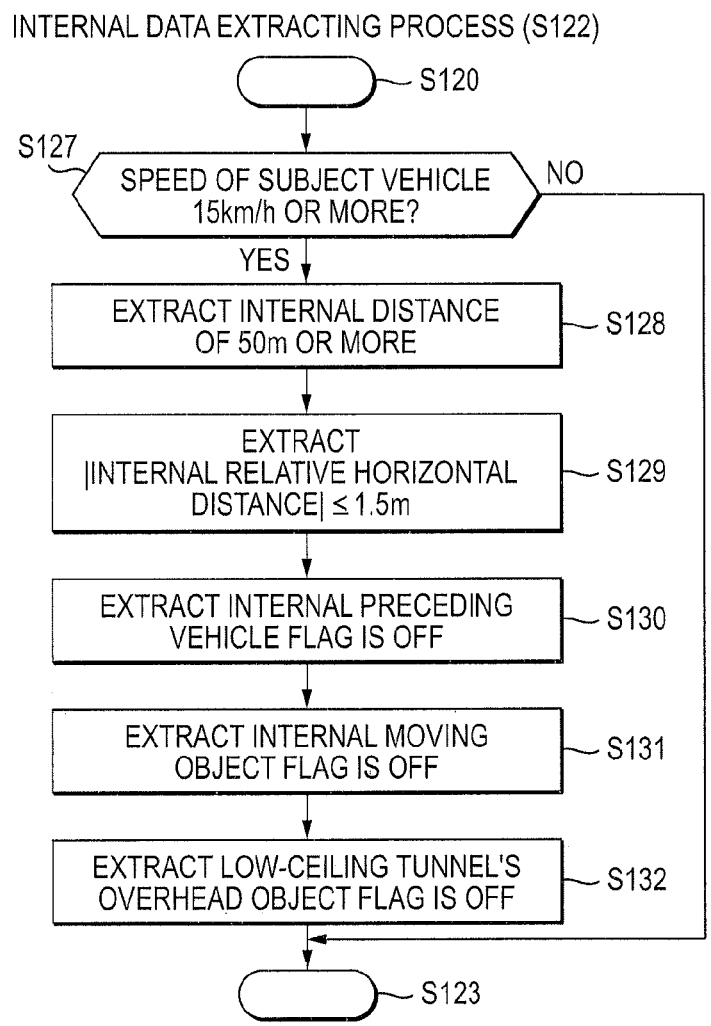
FIG. 9 is a flowchart illustrating a process of extracting internal data.

The process of extracting the internal data will now be described in detail with reference to FIGS. 9 and 10. FIG. 9 is a flowchart illustrating the process of extracting the internal data. As illustrated in FIG. 9, the process of extracting the internal data according to this embodiment is executed when the speed of the subject vehicle is 15 km/h or more. However, the present invention is not limited to 15 km/h or more, and it is possible to appropriately set a speed capable of distinguishing that the subject vehicle is driving. First, the signal processing unit judges whether or not the speed of the subject vehicle is 15 km/h or more (step S127). If the speed of the subject vehicle is less than 15 km/h (No in step S127), the process of extracting the internal data is not executed.

If the speed of the subject vehicle is 15 km/h or more (Yes in step S127), the signal processing unit 18 extracts the internal data, in which an internal distance (distance from the subject vehicle which is derived from the internal data) is 50 m or more, among the whole internal data (step S128). Since the information about the target close to the subject vehicle is possibly wrong, this is to exclude the information. The signal processing unit 18 extracts the internal data of which an absolute value of the relative horizontal distance is 1.5 m or less (step S129). That is, the signal processing unit extracts the internal data that is respectively within 1.5 m in left and right directions on the basis of the subject vehicle. This is to extract only the internal data ahead of the subject vehicle, and to exclude the internal data that is at a low position having a low relation with a control such as drive or stop. In this instance, the distance and the relative horizontal distance to extract the internal data are 50 m or more and 1.5 m or less, respectively, as an example, but the present invention is not limited thereto. The distance from the subject vehicle can be set to any distance as long as it can exclude the target information which may be wrong information, and the relative horizontal distance can be set to any distance as long as it can exclude the internal data having the low relation with the control such as the drive of the subject vehicle.

And, the signal processing unit 18 extracts internal data of which a preceding vehicle flag is off (step S130). The preceding vehicle flag is a flag indicative of whether or not it is the preceding vehicle. If the internal data is the target information relating to the preceding vehicle, the flag is on, while if the internal data is not the target information relating to the preceding vehicle, the flag is off. For example, if it is not conditional on the preceding vehicle flag, the internal data derived at timing when the preceding vehicle is stopped may be judged as the stationary object such as illumination of the ceiling. But, if the preceding flag is on, it would be noted that its internal data relates to the preceding vehicle. Accordingly, under the condition that the preceding flag is off, it is possible to avoid the internal data from being incorrectly judged as the stationary target such as illumination of the ceiling.

The signal processing unit 18 extracts the internal data of which a moving object flag is off (step S131). The moving object flag is a flag indicative of whether or not a subject target is a moving object. If its internal data is the target information relating to the moving object, the moving object flag is on, while if its internal data is not the target information relating to the moving object, the moving object flag is off. The reason why the condition to be met is that the moving object flag is off is to extract the stationary object. And, the signal processing unit extracts internal data of which a low-ceiling overhead object flag is off, among the internal data extracted under the above condition (step S132). In this instance, the low-ceiling overhead object flag is a flag indicative of whether or not its internal data is the target information relating to the overhead object of the low-ceiling tunnel, and a flag according to the result of the previous judging process is set in the internal data.

Therefore, it is possible to extract the internal data having the possibility that it is the overhead object of the low-ceiling tunnel. In this instance, the present invention is not limited to the sequence of the above-described steps S128 to S132, and the steps may be executed in any sequence, or may be executed simultaneously.

Figure 10:
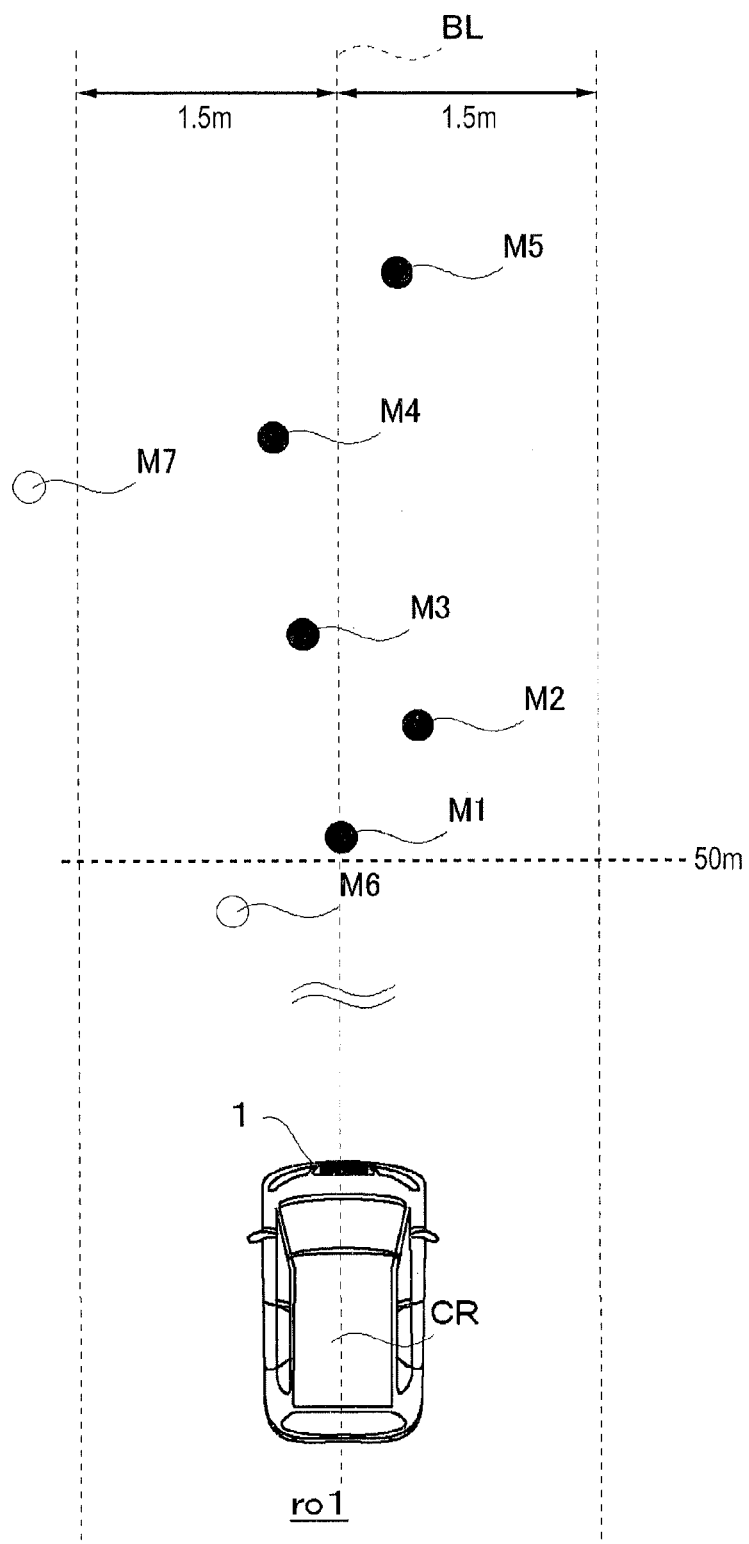
FIG. 10 is a diagram describing the process of extracting the internal data.

FIG. 10 is a diagram describing the process of extracting the internal data. FIG. 10 is the diagram when seen from a top of the vehicle. As illustrated in FIG. 10, internal data M1 to M5 is extracted, of which it exists within the range from the subject vehicle to 50 m or more and it exists within the range of the absolute value of the relative horizontal distance of 1.5 m or less. Internal data M6 of which it exists at the position of less than 50 m from the subject vehicle, and internal data M7 of which it exists within the range of the absolute value of the relative horizontal distance of 1.5 m or more are not-managed internal data, and thus are not extracted. If all the preceding vehicle flag, the moving object flag, and the low-ceiling overhead object flag of the internal data M1 to M5 are off, the internal data M1 to M5 become internal data extracted in the internal data extracting process.

Returning back to FIG. 8, the signal processing unit performs a process of deriving the number of stationary object pairs (step S123). The stationary object pair means paired data derived as the stationary object, and, in this step, the process of deriving the number of the paired data, which exists within a predetermined range, among the paired data derived as the stationary object is executed.

Figure 11:
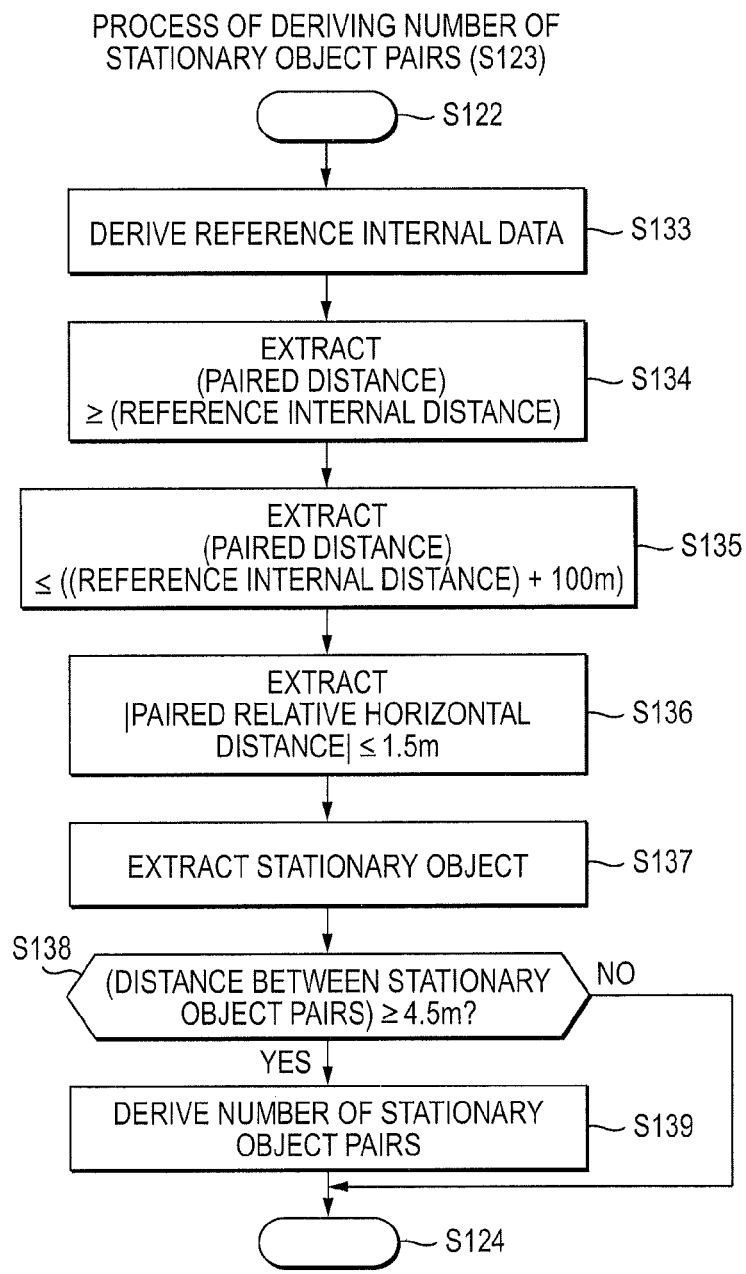
FIG. 11 is a flowchart illustrating a process of deriving the number of stationary object pairs.

The process of deriving the number of stationary object pairs will now be described with reference to FIGS. 11 and 12. FIG. 11 is a flowchart illustrating the process of deriving the number of stationary object pairs. As illustrated in FIG. 11, the signal processing unit 18 first derives a reference internal data (step S133). The reference internal data is internal data, which is closest to the subject vehicle, among the internal data extracted in the above-described internal data extracting process.

The signal processing unit 18 extracts paired data existing within a predetermined range remote from the subject vehicle, with the reference internal data being as a base point (step S134). That is, the paired data, of which the paired distance (distance from the subject vehicle which is derived from the paired data) is above the reference internal distance (distance from the subject vehicle which is derived from the reference internal data), is derived. In addition, the signal processing unit 18 extracts paired data, which exists at the position (i.e., (reference internal distance+100 m) or less) of the subject vehicle side rather than the position remote from 100 in with respect to the reference internal distance, among the paired data (step S135). In this instance, the paired data uses an instantaneous value of the paired data derived by the current scanning.

The signal processing unit 18 extracts paired data, of which an absolute vale of the relative horizontal distance is 1.5 m or less, among the extracted paired data (step S136). In addition, the signal processing unit 18 extracts paired data corresponding to the stationary object, among the paired data extracted in step S136 (step S137). The step is executed by extracting paired data of which a moving flag is off. The extracted paired data is the stationary object pair. Although the range from the reference internal distance or more to (reference internal distance+100) or less has been described as an example of the range to extract the stationary object pair, the present invention is not limited thereto. It may set appropriately a range capable of extracting the stationary object pair as the number united to some extents. Further, although 1.5 m has been described as an example of the relative horizontal position, it is possible to appropriately set a given distance capable of excluding the paired data having a low relation with the control such as the drive of the subject vehicle.

The signal processing unit 18 judges whether or not the distance between the extracted stationary objects is 4.5 m or more (above first distance) (step S138). Since the illuminations installed at the ceiling are disposed at regular intervals, it is to distinguish it from the ceiling overhead objects and other stationary objects. In this instance, in the step, the signal processing unit judges whether or not the distance between all the extracted stationary objects is 4.5 m or more.

If the distance between the stationary object pairs is less than 4.5 m (No in step S138), the process of deriving the number of stationary object pairs is completed. The second unwanted object removing process itself may be completed. If the distance between the stationary object pairs is 4.5 m or more (Yes in step S138), the signal processing unit 18 derives the number of paired data (the number of stationary object pairs) extracted by such a condition (step S139). In this instance, the case in which the distance between the stationary object pairs used for the judgment of the deriving process is 4.5 m has been described as an example, but the present invention is not limited thereto. The interval of the stationary objects, such as the illumination installed at the ceiling of tunnel may be different from each other every tunnel, the distance corresponding to the interval of the stationary objects to be derived for the subject tunnel may be set appropriately.

The number of the stationary object pairs corresponding to the internal data is derived. In this instance, the present invention is not limited to the sequence of the above-described steps S133 to S137, and the steps may be executed in any sequence, or may be executed simultaneously.

Figure 12:
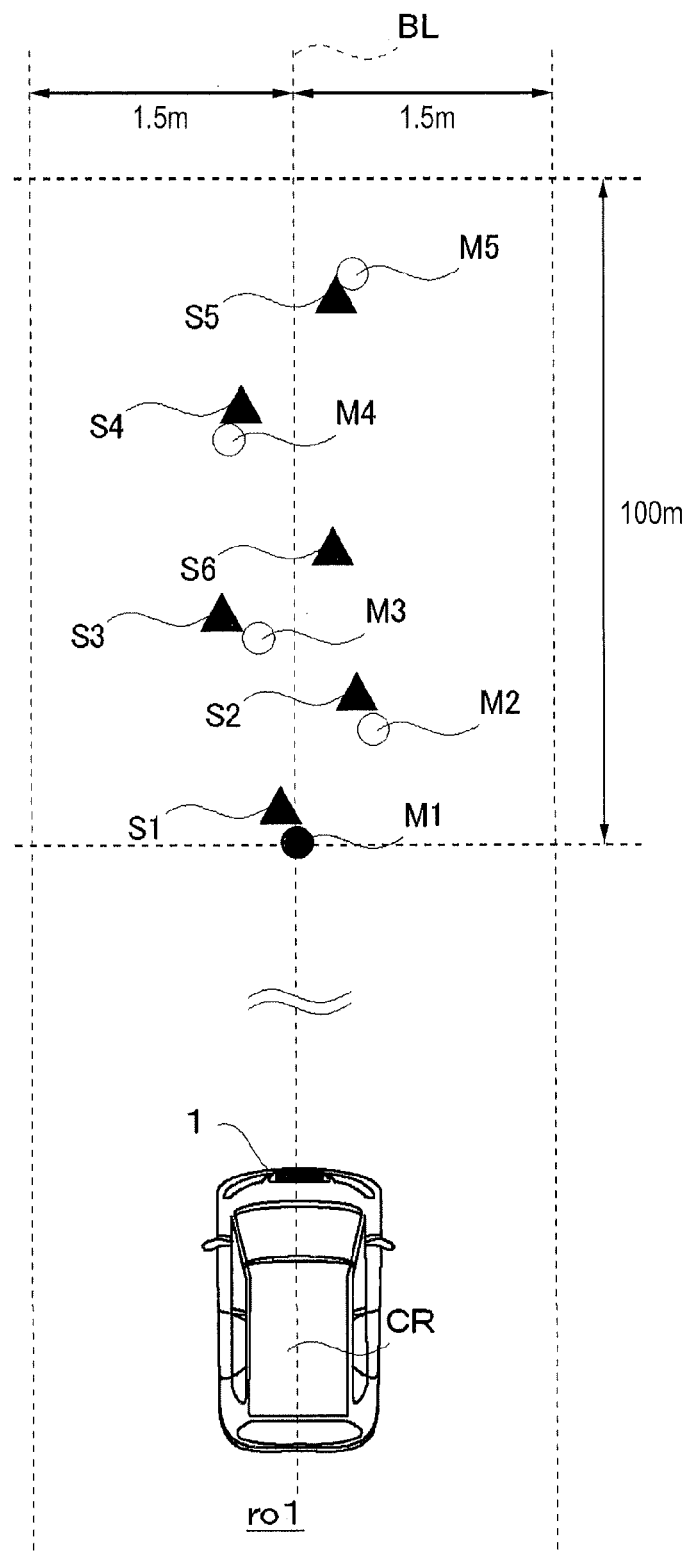
FIG. 12 is a diagram describing the process of deriving the number of stationary object pairs.

FIG. 12 is a diagram describing the process of deriving the number of stationary object pairs. FIG. 12 is a diagram when seen from the top of the vehicle. As illustrated in FIG. 12, the stationary object pairs S1 to S6 exist within the range of a place far away from the subject vehicle by 100 m, with the position of the reference internal data M1 being as a base point, and the range of the absolute value of the relative horizontal distance of 1.5 m or less. If the distance of the respective stationary object pairs S1 to S6 is 4.5 m or more, 6 is derived as the number of the stationary object pairs existing within the range.

Returning back to FIG. 8, the signal processing unit performs the process of deriving the low-ceiling tunnel's overhead object (step S124). Based on the number of the stationary object pairs derived in previous step S123, the signal processing unit derives the target corresponding to the overhead object of the tunnel having the low ceiling, among the internal data existing within the predetermined range.

Figure 13:
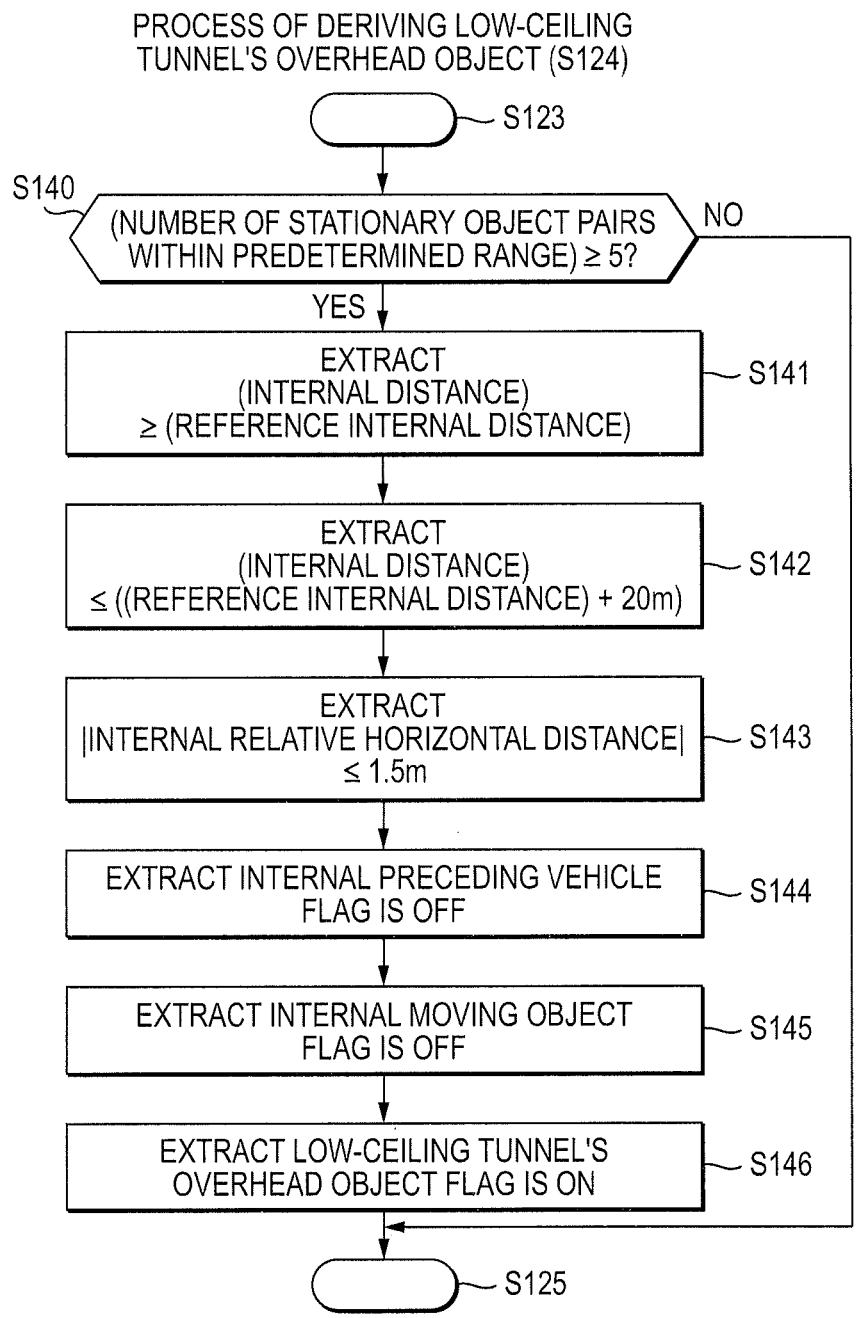
FIG. 13 is a flowchart illustrating a process of deriving a low-ceiling tunnel's overhead object.

The process of deriving the low-ceiling tunnel's overhead object will now be described with reference to FIGS. 13 and 14. FIG. 13 is a flowchart describing the process of deriving the low-ceiling tunnel's overhead object. As illustrated in FIG. 13, the signal processing unit 18 first judges whether or not the number of the stationary object pairs within the predetermined range is 5 or more (above first threshold) (step S140). The predetermined range in the step means a range of (reference internal distance+20 m) or less, and a range of the absolute value of the relative horizontal distance of 1.5 m or less. That is, within the range, the signal processing unit judges whether or not the number of the stationary object pairs derived in previous step S123 is 5 or more.

If the number of the stationary object pairs is less than 5 (No in step S140), the process of judging the low-ceiling tunnel's overhead object is not performed. The second unwanted object removing process itself may be completed, if the number of the stationary object pairs is 5 or more (Yes in step S140), the signal processing unit 18 extracts the internal data of which the internal distance (distance from the subject vehicle derived from the internal data) is above the reference internal distance (step S141). In addition, the signal processing unit 18 extracts the internal data of which the internal distance is (reference internal distance+20 m) or less (step S142). And, the signal processing unit 18 extracts the internal data of which the absolute value of the relative horizontal distance is 1.5 m or less (step S143). That is, the signal processing unit 18 extracts the internal data of which the internal distance is in the range from the reference internal distance to (reference internal distance+20 m) or less, and the absolute value of the relative horizontal distance is 1.5 m or less.

In this embodiment the case of extracting the internal data if the number of the stationary object pairs is 5 or more has been described as an example, but the present invention is not limited thereto. Since there are many cases where the illumination or the like installed at the ceiling are disposed at regular intervals, a plurality of illuminations exist within a constant range. For this reason, it is preferable to extract the number united to some extents, and to use the number of stationary object pairs that can be distinguished as the stationary object corresponding to the overhead object. Further, the range to extract the internal data is set from the reference internal distance or more to (reference internal distance+20 m) or less, but the present invention is not limited thereto. Since there is the possibility that the internal data existing within the distance far away from the subject vehicle is wrong, the distance is preferably set to exclude such internal data. Further, the relative horizontal distance is not limited to the case of 1.5 m, similar to the above description, it is preferably set to a distance capable of excluding the paired data having the low relation with the control such as the drive of the subject vehicle.

The signal processing unit 18 extracts the internal data of which the preceding vehicle flag is off, among the extracted internal data (step S144), and simultaneously, extracts the internal data of which the moving object flag is off (step S145). The signal processing unit 18 judges that the target corresponding to the internal data extracted by the above manner is the overhead object of the low-ceiling tunnel, and sets the low-ceiling tunnel's overhead object flag of the internal data is set to on (step S146).

Figure 14:
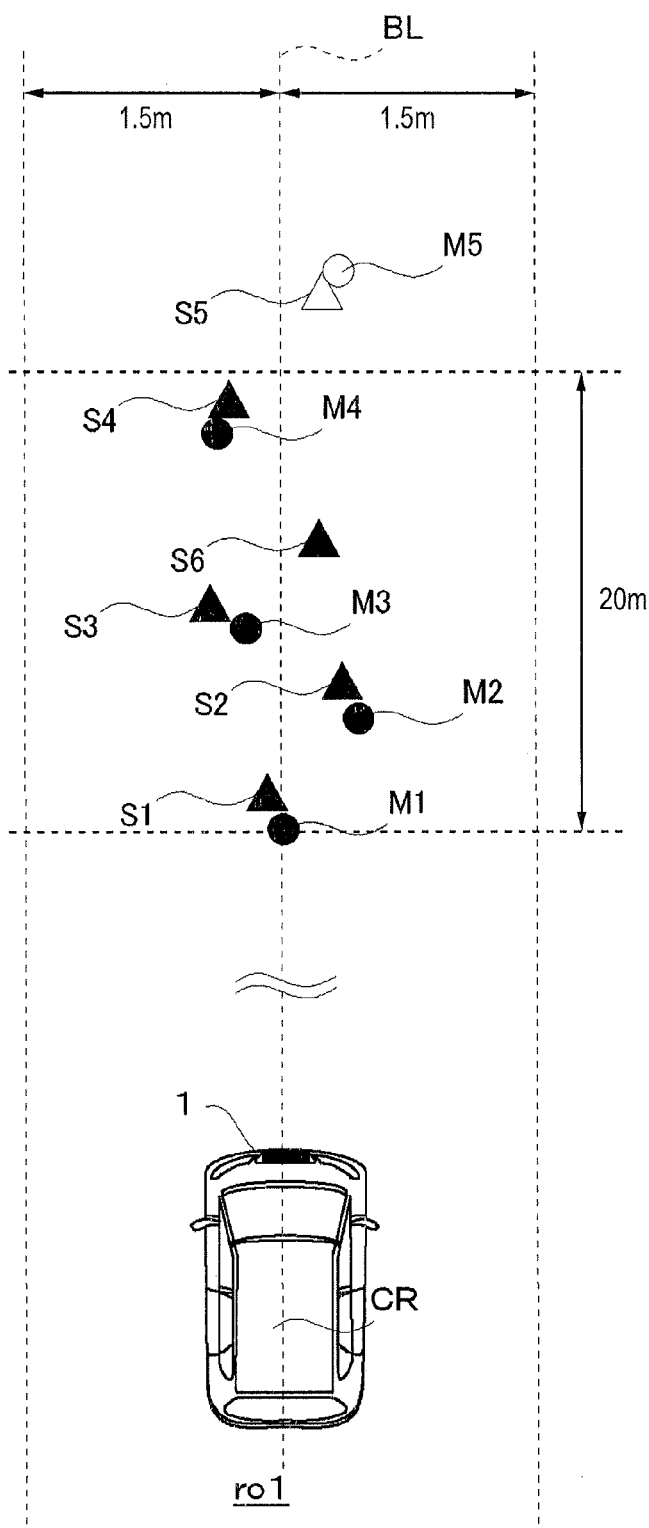
FIG. 14 is a diagram describing the process of deriving the low-ceiling tunnel's overhead object.

FIG. 14 is a diagram describing the process of deriving the low-ceiling tunnel's overhead object. FIG. 14 is a diagram when seen from the top of the vehicle. As illustrated in FIG. 14, the number of stationary object pairs existing within the range of a place far away from the subject vehicle by 20 m, with the position of the reference internal data M1 being as a base point, and the range of the absolute value of the relative horizontal distance of 1.5 m or less is 5 or more (S1 to S4 and S6). Further, the internal data M1 to M4 exist in the same range. If the preceding vehicle flag and the moving object flag of the internal data M1 to M4 are set to off, the internal data M1 to M4 are derived as the target corresponding to the overhead object of the low-ceiling tunnel, and the low-ceiling tunnel's overhead object flag is set to on. In this instance, in a case where there is the internal data that does not meet the condition on each process described above, the low-ceiling tunnel's overhead object flags of the internal data are maintained in the previous values.

Subsequently, returning to FIG. 8, the signal processing unit performs a process of releasing the low-ceiling tunnel's overhead object (step S125). Even though the target is judged as the low-ceiling tunnel's overhead object, there is the possibility that the judgment is wrong. This step is to release the judgment if the target is judged as the low-ceiling tunnel's overhead object.

Figure 15:
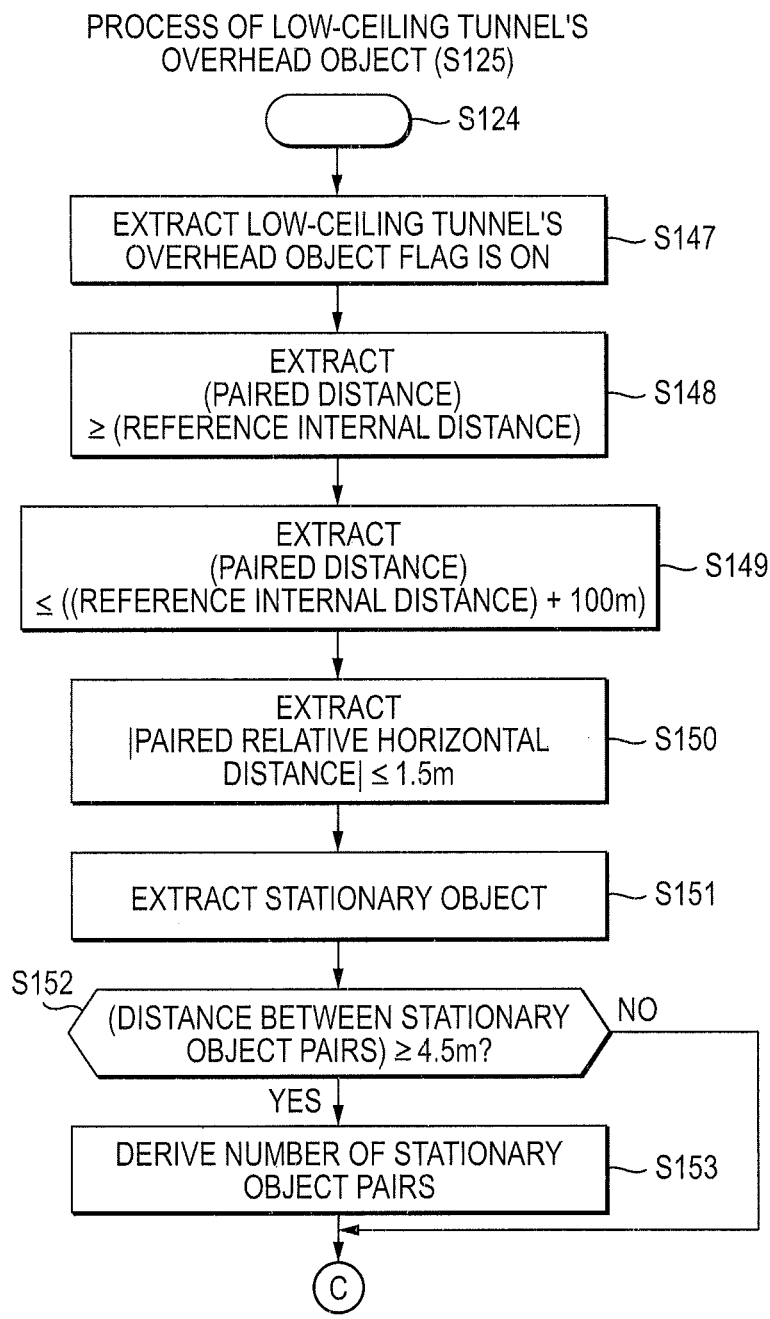
FIG. 15 is a flowchart illustrating a process of canceling the low-ceiling tunnel's overhead object.
Figure 16:
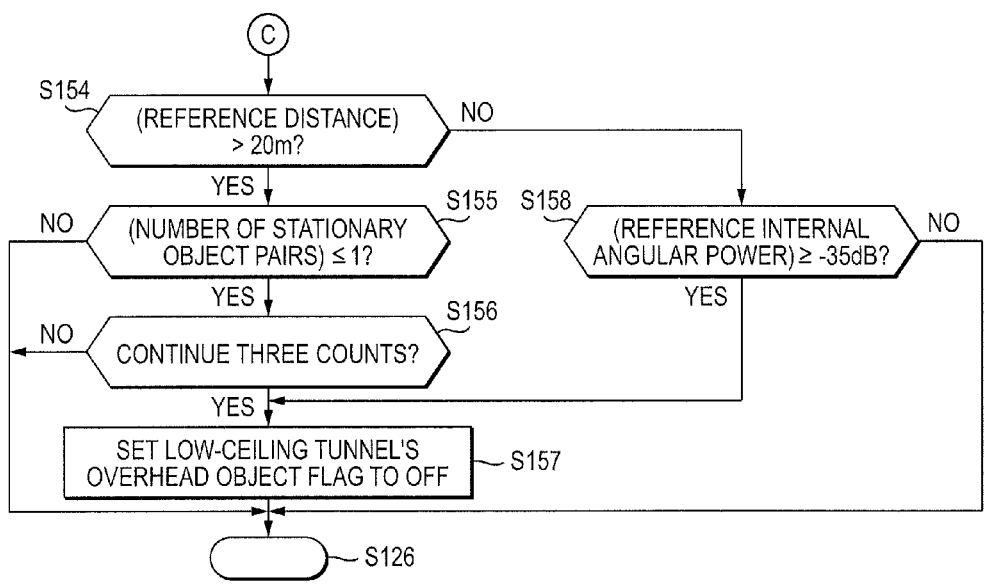
FIG. 16 is a flowchart illustrating the process of canceling the low-ceiling tunnel's overhead object.

The process of releasing the low-ceiling tunnel's overhead object will now be described with reference to FIGS. 15 to 17. FIGS. 15 and 16 are flowcharts describing the process of releasing the low-ceiling tunnel's overhead object. As illustrated in FIG. 15, the signal processing unit 18 first extracts the internal data of which the low-ceiling tunnel's overhead object flag is on (step S147). This is because the target judged as the overhead object of the low-ceiling tunnel at the time of the process becomes a subject to be released.

The signal processing unit derives the number of stationary object pairs existing within the predetermined range. Specifically, the signal processing unit 18 extracts the paired data existing within the range from the reference internal distance or more to (reference internal distance+100 m) or less (step S148 and step S149). And, the signal processing unit 18 extracts the paired data, of which the absolute value of the relative horizontal distance is 1.5 m or less, among the extracted paired data (step S150). In this instance, the range from the reference internal distance or more to (reference internal distance+100 m) or less, and the range of the absolute value of the relative horizontal distance of 1.5 m or less have been described as an example of the predetermined range, but the present invention is not limited thereto. Similar to the processes of steps S133 to S137, the range can be appropriately set.

Subsequently, the signal processing unit 18 extracts the paired data corresponding to the stationary object, among the extracted paired data (step S151). This step is performed by extracting the paired data of which the moving object flag is off, and the paired data extracted by the above process is the stationary object pair.

The signal processing unit 18 judges whether or not the distance between the extracted stationary pairs is 4.5 m or more (step S152). In this step, the signal processing unit judges whether or not the distance between all the extracted stationary object pairs is 4.5 or more. If the distance between the stationary object pairs is less than 4.5 m (No in step S152), the process of releasing the low-ceiling tunnel's overhead object flag is completed. The second unwanted object removing process may be completed. If the distance between the stationary object pairs is 4.5 m or more (Yes in step S152), the signal processing unit 18 derives the number of paired data (the number of stationary object pairs) extracted by such a condition (step S153). In this instance, the distance between the stationary object pairs is not limited to 4.5 m, similar to the above-described step S148, and may be set appropriately.

In this instance, the present invention is not limited to the sequence of the above-described steps S147 to S151, and the steps may be executed in any sequence, or may be executed simultaneously. Instead of deriving the number of stationary object pairs in step S125, the number of stationary object pairs derived in the above-described step S123.

Subsequently, the signal processing unit judges whether or not the extracted internal data is a target to release the judgment in that it is the overhead target of the low-ceiling tunnel Specifically, as illustrated in FIG. 16, the signal processing unit 18 judges whether or not the reference internal distance is more than 20 m (step S154). If the reference internal distance is more than 20 m (Yes in step S154), the signal processing unit 18 judges whether or not the number of stationary object pairs derived in step S153 is 1 or less (below the second threshold) (step S155). If the number of stationary object pairs is more than 1 (No in step S155), the signal processing unit judges that the internal data is the overhead object of the low-ceiling tunnel, and the process is completed. The low-ceiling tunnel's overhead object flag is maintained.

Meanwhile, if the number of stationary object pairs is 1 or less (Yes in step S155), the signal processing unit 18 whether three counts are continuous or not (step S156). Specifically, the signal processing unit 18 judges whether or not the same internal data meets step 154 and step 155 at consecutive scanning of three times. If three counts are not consecutive (No in step S156), the signal processing unit judges that the internal data is the overhead object of the low-ceiling tunnel, and the process is completed. The low-ceiling tunnel's overhead object flag is maintained. Meanwhile, if three counts are consecutive (Yes in step S156), the signal processing unit 18 judges that the internal data is not the overhead object of the low-ceiling tunnel, and then sets the low-ceiling tunnel's overhead object flag to off (step S157).

In the process of step S154, if the reference internal distance is 20 m or less (No in step S154), the signal processing unit 18 judges whether or not angular power of the reference internal data is −35 dB or more (step S158). If the angular power is above a predetermined value, there is high possibility that the internal data the internal data is not the low-ceiling tunnel's overhead target information, but the target information of the preceding vehicle or the like. For this reason, if the angular power is −35 dB or more (Yes in step S158), the signal processing unit 18 sets the low-ceiling tunnel's overhead object flag of the internal data to off (step S157). Meanwhile, if the angular power is less than −35 dB (No in step S158), the signal processing judges that the internal data is the overhead object of the low-ceiling tunnel, and maintains the low-ceiling tunnel's overhead object flag.

In this instance, although the judging reference is that the reference internal distance is 20 m or more, the present invention is not limited thereto, and a distance capable of excluding the target information having the possibility of wrong information is preferable. Further, although the judging reference is that the number of stationary object pairs is 1 or less, the present invention is not limited thereto, and the number capable of judging whether or not it is the overhead object of the low-ceiling tunnel may be based. In addition, although the number of consecutive counts has been described with reference to FIG. 3, the present invention is not limited thereto, and the count number capable of judging whether or not it is the overhead object of the low-ceiling tunnel may be based. Furthermore, although the judging reference is that the angular power is −35 dB or more, the present invention is not limited thereto, and a value capable of judging whether or not it is the target information of the preceding vehicle or the like may be appropriately used.

Figure 17:
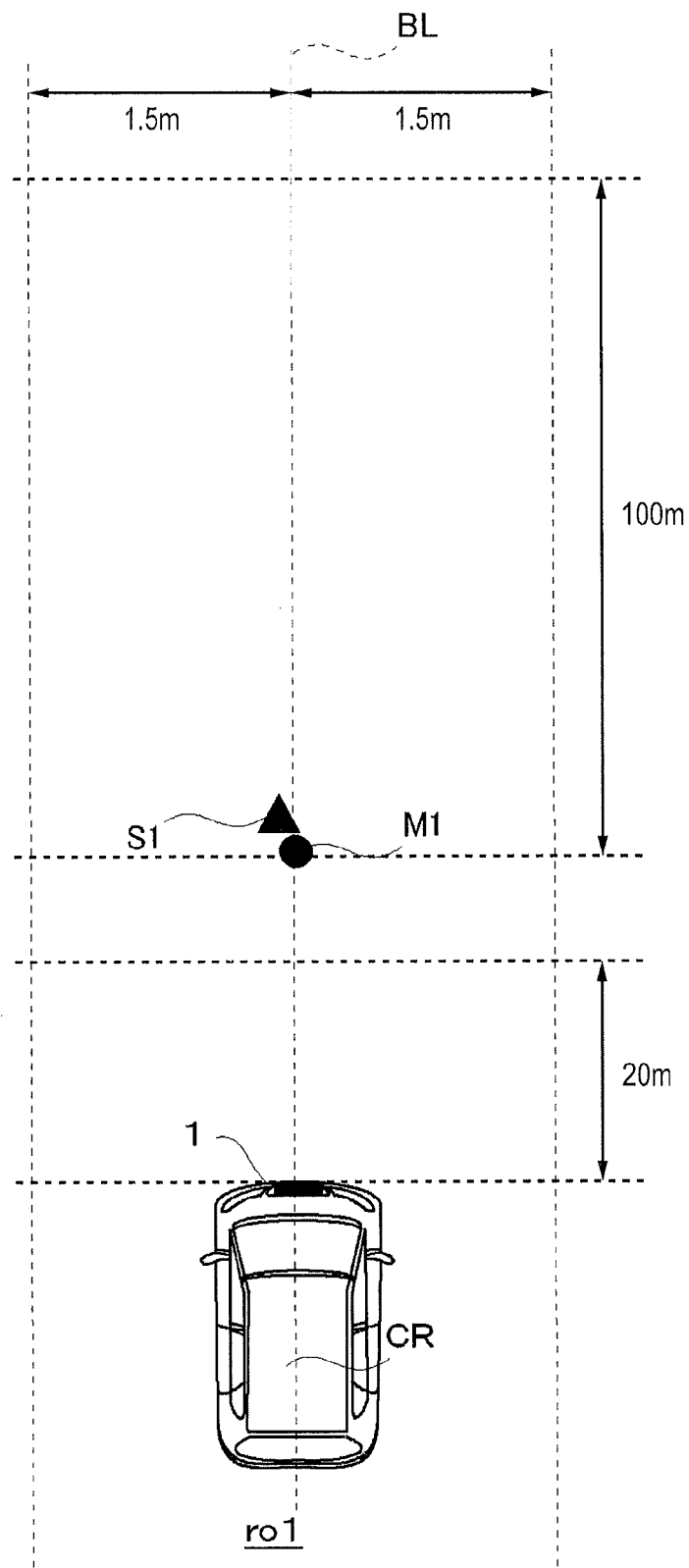
FIG. 17 is a diagram describing the process of canceling the low-ceiling tunnel's overhead object.

FIG. 17 is a diagram describing the process of canceling the low-ceiling tunnel's overhead object. FIG. 17 is a diagram when seen from the top of the vehicle. In the example illustrated in FIG. 17, the reference internal data M1 exists at the position spaced apart from the subject vehicle by 20 m. Further, the number of stationary object pairs existing within the range of a place far away from the subject vehicle by 100 m, with the position of the reference internal data M1 being as a base point, and the range of the absolute value of the relative horizontal distance of 1.5 m or less is 1. Accordingly, since the number of stationary object pairs is 1 or less, If three counts are not consecutive, the signal processing unit judges that the internal data is not the target corresponding to the overhead object of the low-ceiling tunnel, and the low-ceiling tunnel's overhead object flag is set to off.

Returning back to FIG. 8, if the process of deriving the overhead object of the low-ceiling tunnel and the process of releasing the overhead object of the low-ceiling tunnel are completed, the signal processing unit performs the process of removing the overhead object of the low-ceiling tunnel as the unwanted object (step S126). That is, since the internal data, of which the low-ceiling tunnel's overhead object flag is on, among the internal data derived as the target information is the target information which should be originally removed as the overhead object, the internal data is removed in this step. Accordingly, the internal data is not output to the vehicle control device 2 in the next target output process (step S116), so that it is possible to prevent the wrong vehicle control.

2. Second Embodiment

Next, the second embodiment will now be described. In the second embodiment, the method of the second unwanted object removing process is changed in the case where the subject vehicle drives in the low-ceiling tunnel, and the case where the subject vehicle drives at other locations. The configuration of the vehicle control system 10 according to the second embodiment is identical to that according to the first embodiment. Since the process of the second embodiment is substantially identical to the whole process of the first embodiment described above, except for the second unwanted object removing process (step S121). Therefore, the second unwanted object removing process will be described hereinafter.

<2-1. Unwanted Object Removing Process>

Figure 18:
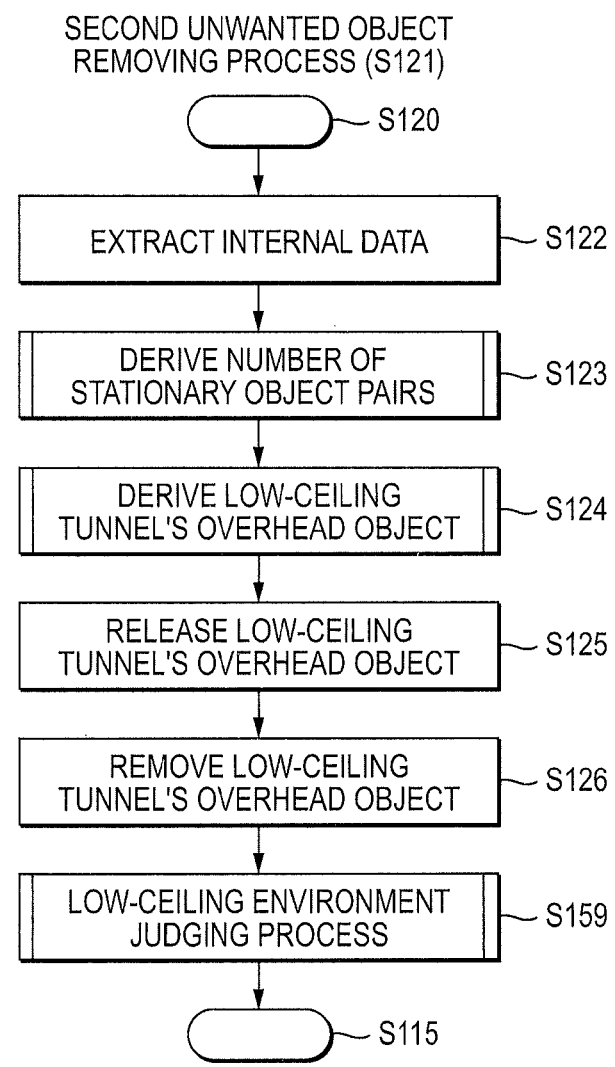
FIG. 18 is a flowchart illustrating the second unwanted object removing process.

FIG. 18 is a flowchart illustrating the second unwanted object removing process according to the second embodiment. As illustrated in FIG. 18, in the second unwanted object removing process according to this embodiment, a low-ceiling environment judging process (step S159) is performed after the low-ceiling tunnel's overhead object is derived. The low-ceiling environment judging process is a process of judging whether or not the subject vehicle is driving in the low-ceiling tunnel, and sets a low-ceiling environment flag according to the judging result. In the case where the subject vehicle is under the same environment as that it is driving in the low-ceiling tunnel, the signal processing unit sets the low-ceiling environment flag to on, while sets it to off in the case where the subject vehicle is not under such environment.

Further, in this embodiment, in the process (step S123) of deriving the number of stationary object pairs and the process (step S124) of deriving the low-ceiling tunnel's overhead object, the process with the condition changed is executed according to the on or off of the low-ceiling tunnel's overhead object flag. Since there is high possibility that the overhead object to be removed is continuously derived under the environment that the subject vehicle is driving in the low-ceiling tunnel, the conditions on these processes are changed to a condition to easily derive those (relaxed condition), and then these processes are performed. That is, in this embodiment, the process of deriving the number of stationary object pairs, the process of deriving the low-ceiling tunnel's overhead object, and the process of judging the low-ceiling environment are different from those in the first embodiment. For this reason, each process will now be described hereinafter, and the same other processes as those of the first embodiment will not be described herein.

In FIG. 18, the process of judging the low-ceiling environment is executed after the process (step S126) of removing the low-ceiling tunnel's overhead object, but may be executed after the process (step S124) of deriving the low-ceiling tunnel's overhead object or the process (step S125) of releasing the low-ceiling tunnel's overhead object.

Figure 19:
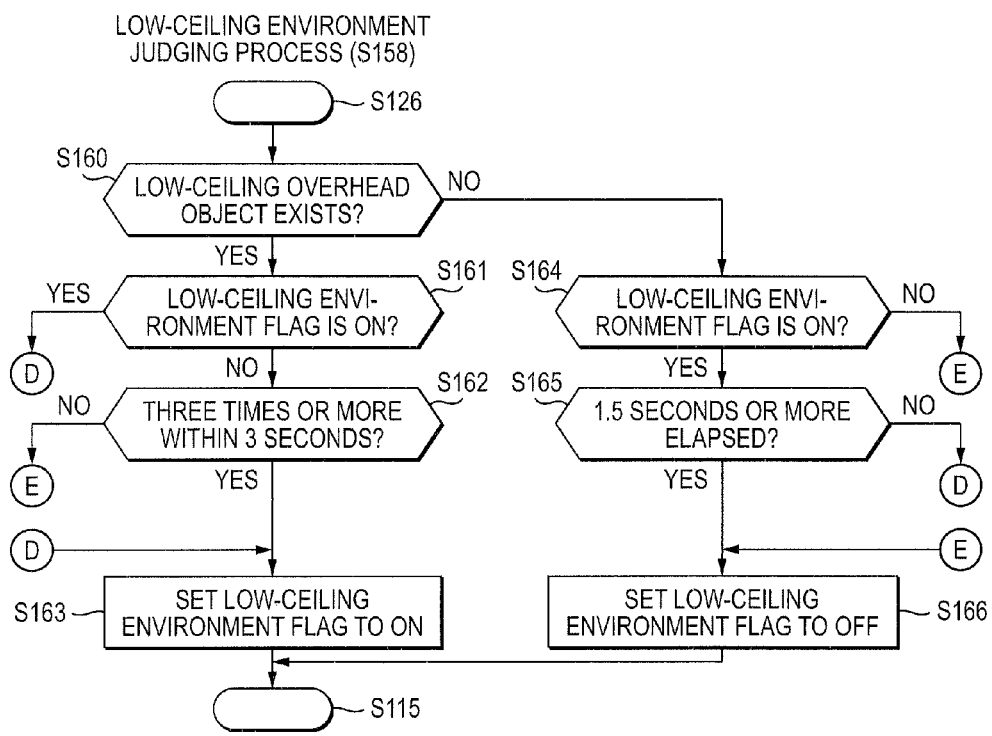
FIG. 19 is a flowchart illustrating a process of judging a low-ceiling environment.

First, the process (step S159) of judging the low-ceiling environment will be described. The process of judging the low-ceiling environment is a process to be executed every scanning. FIG. 19 is a flowchart illustrating the process of judging the low-ceiling environment. As illustrated in FIG. 19, if the process of deriving the low-ceiling tunnel's overhead object is completed, the signal processing unit 18 judges whether (internal data corresponding to) the low-ceiling tunnel's overhead object is derived or not at the subject scanning (step S160).

If the low-ceiling tunnel's overhead object is derived (Yes in step S160), the signal processing unit 18 judges whether the low-ceiling environment flag is on or not at the subject scanning (step S161). If the low-ceiling environment flag is on (Yes in step S161), the signal processing unit 18 maintains the low-ceiling environment flag in the on state (step S163).

Meanwhile, if the low-ceiling environment flag is not on (No in step S161), that is, if the low-ceiling environment flag is off, the signal processing unit 18 judges whether or not the low-ceiling tunnel's overhead object is derived three times or more at the scanning within three seconds immediately before the previous scanning including the current scanning (step S162). If the low-ceiling tunnel's overhead object is derived three times or more within three seconds immediately before the previous scanning (Yes in step S162), the signal processing unit 19 judges that the subject vehicle is driving in the low-ceiling tunnel, and thus sets the low-ceiling environment flag to on (step S163). Meanwhile, if it is not derived (No in step S162), the signal processing unit 18 maintains the low-ceiling environment flag in the off state (step S166). In this instance, the condition of judging the on/off state of the low-ceiling environment flag is three times within three seconds, but the present invention is not limited thereto. It is possible to appropriately set a frequency capable of judging that the subject vehicle is driving in the low-ceiling tunnel.

Next, in step S160, if the low-ceiling tunnel's overhead object is not derived (No in step S160), the signal processing unit 18 judges whether the low-ceiling environment flag is on or not at the subject scanning (step S164). If the low-ceiling environment flag is not on (No in step S164), that is, if the low-ceiling environment flag is off, the signal processing unit 18 maintains the low-ceiling environment flag in the off state (step S166).

If the low-ceiling environment flag is on (Yes in step S164), the signal processing unit 18 judges whether or not the on state of the low-ceiling environment flag has elapsed 1.5 seconds (predetermined time) (step S165). If 1.5 seconds or more has elapsed after the low-ceiling environment flag is set to on (Yes in step S165), the signal processing unit 18 sets the low-ceiling environment flag to off (step S166). Meanwhile, if the 1.5 seconds has not elapsed (No in step S165), the signal processing unit 18 maintains the low-ceiling environment flag in the on state (step S163).

Since it is considered that the subject vehicle is driving in the low-ceiling tunnel if the low-ceiling environment flag is set to on, even though the low-ceiling tunnel's overhead object is not derived at the scanning immediately after the subject scanning, it could not be derived at the scanning. For this reason, the predetermined time maintains the flag in the on state. If the low-ceiling tunnel's overhead object is not derived once for 1.5 seconds, the signal processing unit judges that the subject vehicle is not driving in the low-ceiling tunnel, and sets the low-ceiling environment flag to off. In this way, after the low-ceiling environment flag is set to on, the on state is maintained for at least 1.5 seconds. In this instance, the predetermined time capable of maintaining the low-ceiling environment flag in the on state is 1.5 seconds, but the present invention is not limited thereto. The predetermined time may be appropriately set.

Figure 20:
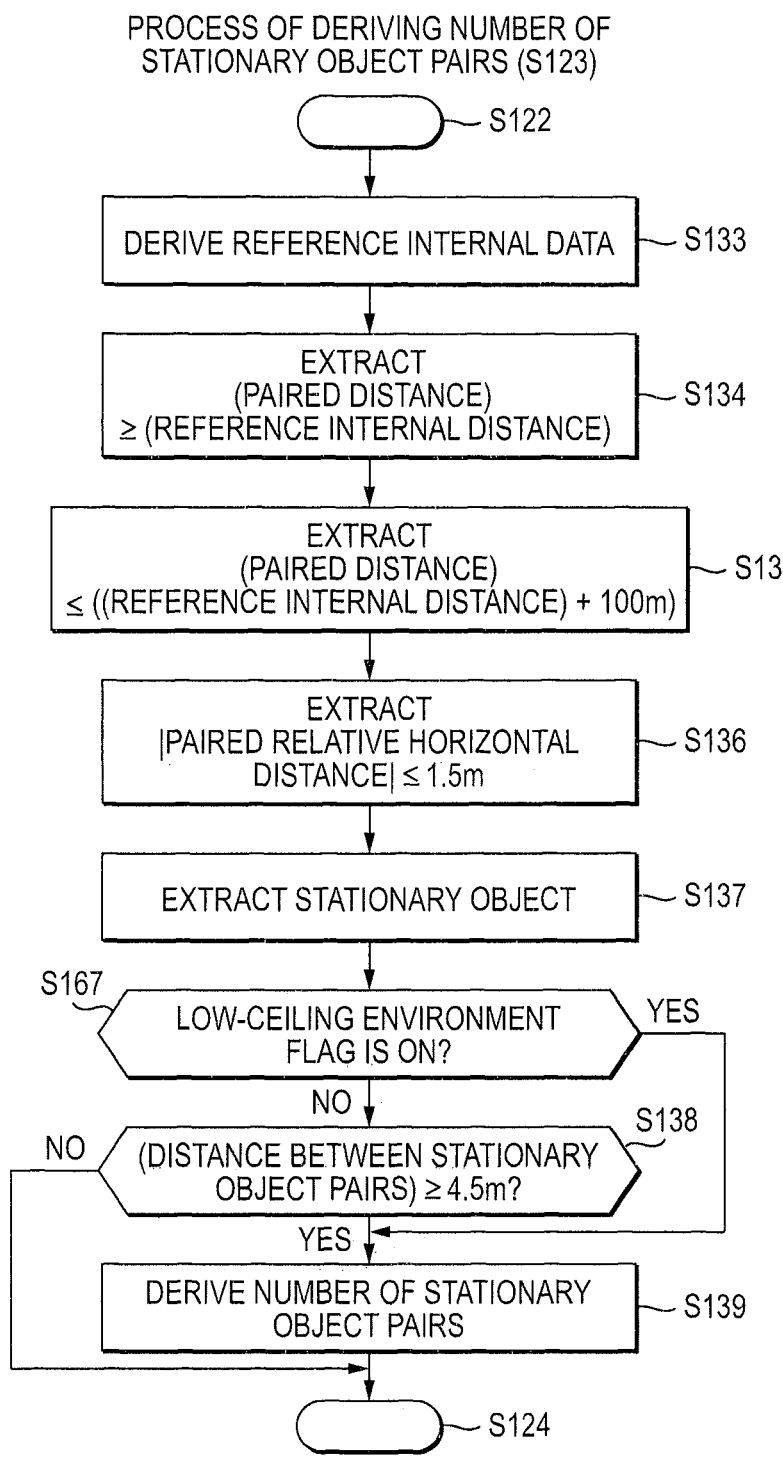
FIG. 20 is a flowchart illustrating the process of deriving the number of stationary object pairs.

Next, the process of deriving the number of stationary object pairs according to this embodiment will be described. FIG. 20 is a flowchart illustrating the process of deriving the number of stationary object pairs. The processes (step S133 to step S137) from the process of deriving the reference internal data to the process of extracting the stationary object pairs are identical to those according to the first embodiment. In this embodiment, after the stationary object pairs are extracted, the signal processing unit 18 judges whether or not the low-ceiling environment flag is on at the subject scanning (step S167). If the low-ceiling environment flag is off (No in step S167), the subsequent process is identical to that of the first embodiment.

Meanwhile, if the low-ceiling environment flag is on (Yes in step S167), the signal processing unit 18 executes the process of deriving the number of stationary object pairs (step S139), irrespective of the distance between the stationary object pairs. That is, without performing the process (step S138) of judging whether or not the distance between the stationary object pairs is 4.5 m or more, the process of deriving the number of stationary object pairs is performed. Accordingly, the number of stationary object pairs is derived even though the distance between the stationary object pairs is less than 4.5 m. Since the subject vehicle is under the environment that it drives in the low-ceiling tunnel, there is high possibility that the derived stationary object pair is the overhead object. For this reason, the condition on the distance between the stationary object pairs is excluded to reliably derive the overhead object. In this instance, as long as the distance can reliably derive the overhead object, without excluding the condition on the distance between the stationary object pairs, a distance (second distance) of less than 4.5 m may be conditioned. That is, this embodiment can employ both a case of not executing the judging process which is conditional on the distance between the stationary object pairs, and a case of executing a process of judging whether or not the distance between the stationary object pairs is above the distance which is conditional on an optional distance from 0 m or more to less than 4.5 m. In this instance, the process of deriving the number of stationary object pairs is identical to that of the first embodiment.

Figure 21:
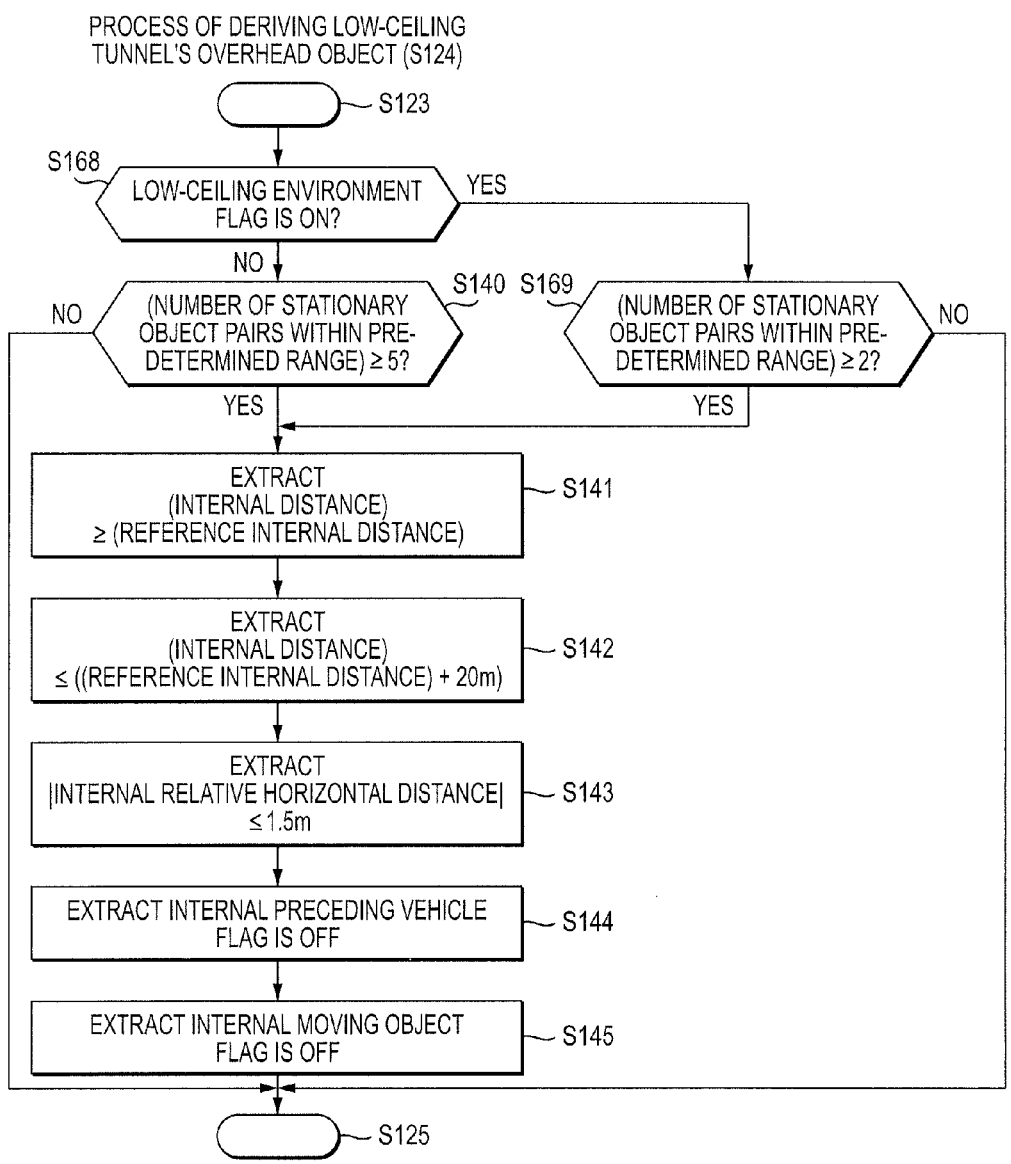
FIG. 21 is a flowchart illustrating the process of deriving the low-ceiling tunnel's overhead object.

Next, the process of deriving the low-ceiling tunnel's overhead object according to this embodiment will now be described. FIG. 21 is a flowchart illustrating the process of deriving the low-ceiling tunnel's overhead object. As illustrated in FIG. 21, in this embodiment, the signal processing unit 18 judges whether or not the low-ceiling environment flag is on at the subject scanning (step S168). In this instance, since the same judging process as the above-described step S167 is performed, the judging result of step S167 may be used, without again performing the judging process.

If the low-ceiling environment flag is not on (No in step S168), the subsequent process is identical to that of the first embodiment. If the low-ceiling environment flag is on (Yes in step S168), the signal processing unit judges whether or not the number of stationary object pairs within the predetermined range is 2 or more (above third threshold) (step S169). The predetermined range is identical to that of the first embodiment.

The first embodiment is conditional on that the number of stationary object pairs is 5 or more, but this embodiment is conditional on 2 or more. Since it is under the environment that the subject vehicle is driving in the low-ceiling tunnel, the condition on the process of deriving the overhead object is relaxed to easily derive the overhead object. Accordingly, if the low-ceiling environment flag is on, the threshold of the number of stationary object pairs is different, as comparison to the off case. Therefore, even though the number of stationary object pairs is 2 or more (Yes in step S169), or the number of stationary object pairs is less than 2 (No in step S169), the subsequent process is identical to the case where the number of stationary object pairs is 5 or more (Yes in step S140) and the case where the number of stationary object pairs is less than 5 (No in step S140), when the low-ceiling environment flag is off.

In this instance, if the low-ceiling environment flag is on, the judging reference is that the number of stationary object pairs is 2 or more, but the present invention is not limited thereto. It is preferable to set the number of stationary object pairs which can easily derive the overhead object relative to the case where the low-ceiling environment flag is off, and it is possible to appropriately use the number of stationary object pairs which is less than the number of stationary object pairs (5 in this embodiment) used for the judgment if the low-ceiling environment flag is off.

In this embodiment, as the process of judging the low-ceiling environment is performed, the condition on the derivation of the overhead object is changed according to the environment that the subject vehicle is driving in the low-ceiling tunnel. Therefore, when the subject vehicle is driving in the low-ceiling tunnel, it is possible to easily derive the overhead object. Therefore, since the unnecessary target information is reliably derived and removed, it is possible to prevent the vehicle control device from performing the wrong vehicle control.

Hereinbefore, the embodiments of the present invention have been described. However, the present invention is not limited to those embodiments, and various modified examples may be made. Hereinafter, such modified examples will be described. On the other hand, all forms, including forms described in the above-described embodiments and forms to be described hereinafter, can be appropriately combined.

In the above-described embodiment, it is described that various functions are realized by software through the arithmetic operation of the CPU according the program. However, a part of these functions may be realized by an electrical hardware circuit. By contrast, a part of the functions that are realized by the hardware circuit may be realized by software.

What is claimed is:

1. A radar apparatus capable of extracting peak signals obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the extracted peak signals, the radar apparatus comprising:

a pairing unit configured to pair a peak signal extracted in the first period and a peak signal extracted in the second period; and a judging unit configured to judge whether or not the target is an overhead object based on the number of paired data of stationary objects existing within a predetermined range from the radar apparatus and being arranged at a substantially regular interval in a traveling direction of a vehicle on which the radar apparatus is mounted, among the paired data obtained by pairing the peak signals in the pairing unit, wherein if the target has been judged as the overhead object for a number of times within a predetermined time and the number of times exceeds a predetermined number, the judging unit subsequently executes a relaxed judging process based on a threshold that is lower than a predetermined threshold for determining an overhead object.

2. The radar apparatus according to claim 1, wherein the judging unit judges that the target is the overhead object, if the number of the paired data of the stationary objects existing within the predetermined range is above a first threshold.

3. The radar apparatus according to claim 2, wherein the judging unit judges that the target is the overhead object, if a distance between the paired data of the stationary objects is above a first distance.

4. The radar apparatus according to claim 2, wherein the judging unit releases a judgment that the target is the overhead object, if the number of the paired data of the stationary objects existing within the predetermined range is below a second threshold.

5. The radar apparatus according to claim 2, wherein the judging unit releases a judgment that the target is the overhead object, if angular power of the target judged as the overhead object is above a predetermined value.

6. The radar apparatus according to claim 4, wherein the judging unit judges that the target is the overhead object, if the number of the paired data of the stationary objects existing within the predetermined range is above a third threshold which is lower than first threshold.

7. The radar apparatus according to claim 3, wherein the judging unit judges that the target is the overhead object, if the distance between the paired data of the stationary objects is above a second distance which is lower than the first distance.

8. The radar apparatus according to claim 1, wherein the judging unit continuously executes the relaxed judging process for a predetermined time.

9. The radar apparatus according to claim 8, wherein if the target is not judged as the overhead object within the predetermined time, the judging limit releases execution of the relaxed judging process.

10. A signal processing method capable of extracting peak signals obtained from a difference frequency between a transmitting signal of which a frequency is changed in a predetermined period, and a receiving signal obtained by receiving a reflection wave of a transmission wave based on the transmitting signal at a target, during a first period in which the frequency of the transmitting signal ascends, and a second period in which the frequency of the transmitting signal descends, and deriving information about the target based on the extracted peak signals, the signal processing method comprising:

(a) pairing, by a pairing unit of a radar apparatus, a peak signal extracted in the first period and a peak signal extracted in the second period;

(b) judging, by a judging unit of the radar apparatus, whether or not the target is an overhead object based on the number of paired data of stationary objects existing within a predetermined range from the radar apparatus and being arranged at a substantially regular interval in a traveling direction of a vehicle on which the radar apparatus is mounted, among the paired data obtained by pairing the peak signals in the step (a), and (c) if the target has been judged as the overhead object for a number of times within a predetermined time and the number of times exceeds a predetermined number, executing a relaxed judging process based on a threshold that is lower than a predetermined threshold for determining an overhead object.

* * * * *